US012480755B2

(12) United States Patent
Ishigami et al.

(10) Patent No.: US 12,480,755 B2
(45) Date of Patent: Nov. 25, 2025

(54) ANGLE DETECTION METHOD AND ANGLE DETECTION DEVICE

(71) Applicant: NIDEC CORPORATION, Kyoto (JP)

(72) Inventors: Shota Ishigami, Kyoto (JP); Toru Kitanoya, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 83 days.

(21) Appl. No.: 18/279,202

(22) PCT Filed: Mar. 10, 2022

(86) PCT No.: PCT/JP2022/010670
§ 371 (c)(1),
(2) Date: Aug. 28, 2023

(87) PCT Pub. No.: WO2022/254863
PCT Pub. Date: Dec. 8, 2022

(65) Prior Publication Data
US 2024/0167804 A1 May 23, 2024

(30) Foreign Application Priority Data
May 31, 2021 (JP) ................................. 2021-090841

(51) Int. Cl.
*G01B 7/30* (2006.01)
*G01D 5/14* (2006.01)

(52) U.S. Cl.
CPC ............... *G01B 7/30* (2013.01); *G01D 5/145* (2013.01)

(58) Field of Classification Search
CPC ................................. G01B 7/30; G01D 5/145
See application file for complete search history.

(56) References Cited

U.S. PATENT DOCUMENTS

| 7,661,297 B2 | 2/2010 | Steinruecken et al. |
| 9,574,915 B1* | 2/2017 | Hwang ............... G01D 18/00 |

(Continued)

FOREIGN PATENT DOCUMENTS

| CN | 111521212 | 8/2020 |
| JP | H0465632 | 3/1992 |

(Continued)

OTHER PUBLICATIONS

"International Search Report (Form PCT/ISA/210) of PCT/JP2022/010670", mailed on May 31, 2022, with English translation thereof, pp. 1-6.

*Primary Examiner* — Reena Aurora
(74) *Attorney, Agent, or Firm* — JCIPRNET

(57) ABSTRACT

One aspect of an angle detection device of the present invention includes: three magnetic sensors that detect a change in magnetic flux due to rotation of a rotation shaft; and a signal processing unit that processes signals output from the three magnetic sensors. The signal processing unit acquires sensor signals output from three magnetic sensors, extracts an intersection point at which two sensor signals among the three sensor signals intersect with each other and a zero-cross point at which each of the three sensor signals intersect with a reference signal level, generates a linear function $\theta(\Delta x)$ representing a straight line connecting the intersection point adjacent to each other and the zero-cross point, calculates a deviation between a mechanical angle $\theta$ calculated based on the linear function $\theta(\Delta x)$ for a plurality of points on the straight line and a mechanical angle $\theta e$ acquired from an encoder installed on a rotation shaft as a first angle error, and generates a first angle error function for calculating a first angle error corresponding to an arbitrary point on the straight line based on the first angle error calculated for the plurality of points on the straight line.

6 Claims, 13 Drawing Sheets

(56) References Cited

U.S. PATENT DOCUMENTS

| | | |
|---|---|---|
| 10,460,251 B2 | 10/2019 | Okanohara et al. |
| 10,976,182 B2 | 4/2021 | Fukumura et al. |
| 11,509,248 B2 | 11/2022 | Ishigami et al. |
| 2019/0003856 A1 | 1/2019 | Kawakami et al. |
| 2020/0103255 A1* | 4/2020 | Yanobe ................ G01D 5/3473 |
| 2020/0217640 A1 | 7/2020 | Märgner et al. |
| 2021/0158157 A1 | 5/2021 | Ganille et al. |

FOREIGN PATENT DOCUMENTS

| | | |
|---|---|---|
| JP | 2004317411 | 11/2004 |
| JP | 2008510092 | 4/2008 |
| JP | 2017156164 | 9/2017 |
| JP | 6233532 | 11/2017 |
| JP | 2020098646 | 6/2020 |
| WO | 2020090595 | 5/2020 |

* cited by examiner

ANGLE DETECTION METHOD AND ANGLE DETECTION DEVICE

CROSS-REFERENCE TO RELATED APPLICATION

This application is a 371 application of the international PCT application serial no. PCT/JP2022/010670, filed on Mar. 10, 2022, which claims the priority benefits of Japan application no. 2021-090841, filed on May 31, 2021. The entirety of each of the above-mentioned patent applications is hereby incorporated by reference herein and made a part of this specification.

FIELD OF THE INVENTION

The present invention relates to an angle detection method and an angle detection device.

BACKGROUND

Conventionally, a configuration including an absolute angle position sensor such as an optical encoder and a resolver is known as a motor capable of accurately controlling a rotational position. However, the absolute angle position sensor is large in size and high in cost.

Therefore, conventionally, a position estimation method of estimating a rotational position of a motor using three inexpensive and small magnetic sensors without using an absolute angle position sensor is known.

In the position estimation method described above, the mechanical angle of the rotation shaft can be estimated with high accuracy using three inexpensive and small magnetic sensors, but higher accuracy is sometimes required from the market.

SUMMARY

One aspect of an exemplary angle detection method of the present invention is an angle detection method for detecting a mechanical angle of a rotation shaft, the angle detection method including: acquiring signals output from three magnetic sensors that detect a change in magnetic flux due to rotation of the rotating shaft as sensor signals, the three sensor signals having a phase difference of 120° in an electrical angle; extracting an intersection point at which two sensor signals among the three sensor signals intersect with each other and a zero-cross point at which each of the three sensor signals intersect with a reference signal level over one mechanical angle cycle; generating a linear function $\theta(\Delta x)$ representing a straight line connecting the intersection point and the zero-cross point adjacent to each other, wherein $\Delta x$ is a length from a start point of the straight line to an arbitrary point on the straight line, and $\theta$ is a mechanical angle corresponding to an arbitrary point on the straight line; calculating, as a first angle error, a deviation between a mechanical angle $\theta$ calculated based on the linear function $\theta(\Delta x)$ and a mechanical angle Ve acquired from an encoder installed on the rotation shaft for a plurality of points on the straight line; storing the first angle error calculated for a plurality of points on the straight line as a learned value; and generating a first angle error function for calculating a first angle error corresponding to an arbitrary point on the straight line based on the first angle error calculated for a plurality of points on the straight line.

One aspect of an exemplary angle detection device of the present invention is an angle detection device that detects a mechanical angle of a rotation shaft, the angle detection device including: three magnetic sensors configured to detect a change in magnetic flux due to rotation of the rotation shaft; and a signal processing unit configured to process signals output from the three magnetic sensors. The signal processing unit is configured to execute: acquiring signals output from the three magnetic sensors as sensor signals, the three sensor signals having a phase difference of 120° in an electrical angle from each other; extracting an intersection point at which two sensor signals among the three sensor signals intersect with each other and a zero-cross point at which each of the three sensor signals intersect with a reference signal level over one mechanical angle cycle; generating a linear function $\theta(\Delta x)$ representing a straight line connecting the intersection point and the zero-cross point adjacent to each other, wherein $\Delta x$ is a length from a start point of the straight line to an arbitrary point on the straight line, and $\theta$ is a mechanical angle corresponding to an arbitrary point on the straight line; calculating, as a first angle error, a deviation between a mechanical angle $\theta$ calculated based on the linear function $\theta(\Delta x)$ and a mechanical angle $\theta e$ acquired from an encoder installed on the rotation shaft for a plurality of points on the straight line; storing the first angle error calculated for a plurality of points on the straight line as a learned value; and generating a first angle error function for calculating a first angle error corresponding to an arbitrary point on the straight line based on the first angle error calculated for a plurality of points on the straight line.

The above and other elements, features, steps, characteristics and advantages of the present disclosure will become more apparent from the following detailed description of the preferred embodiments with reference to the attached drawings.

DETAILED DESCRIPTION

An embodiment of the present invention will be described in detail below with reference to the drawings.

Figure 1:
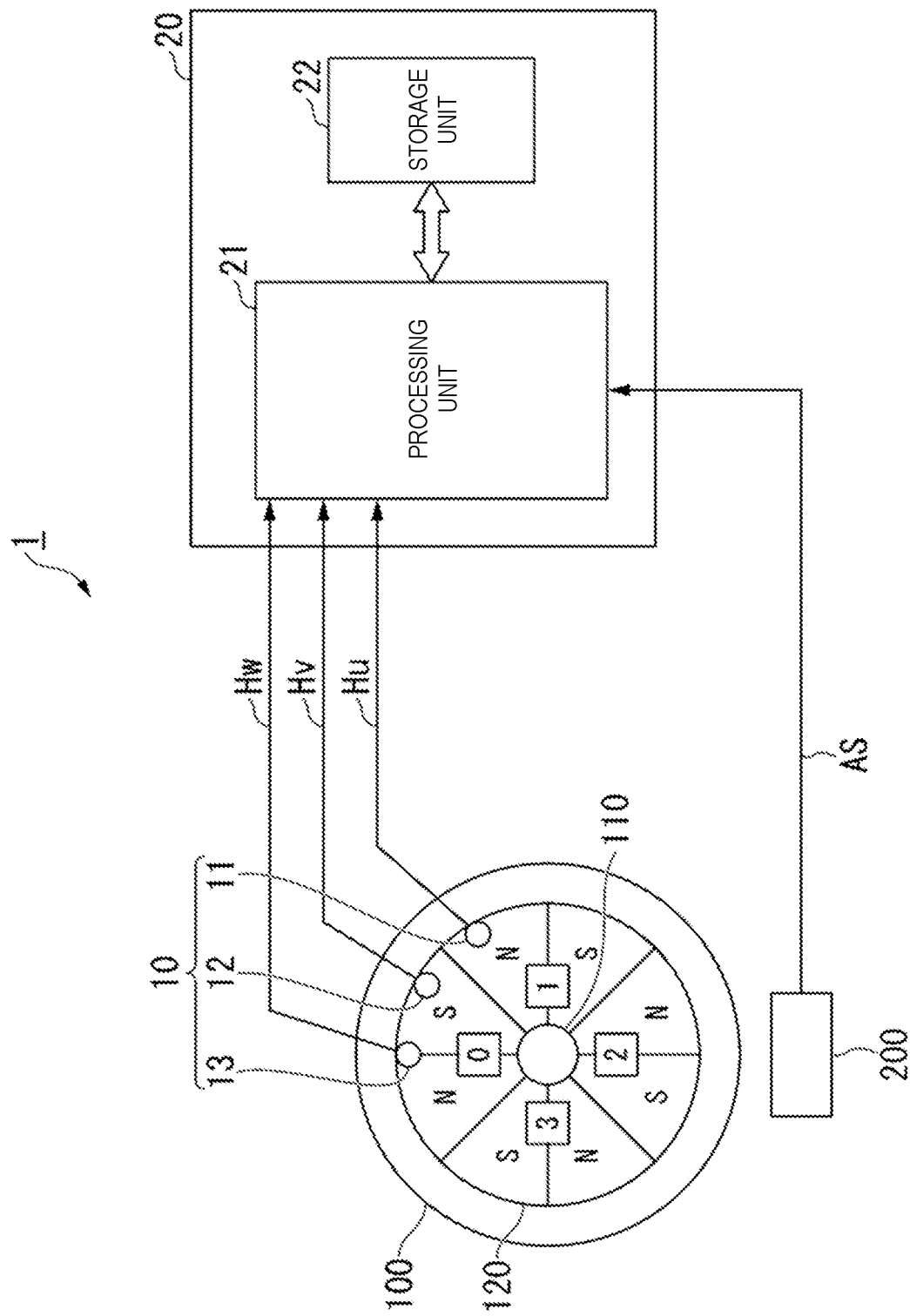
FIG. 1 is a block diagram schematically illustrating a configuration of an angle detection device according to an embodiment of the present invention.

FIG. 1 is a block diagram schematically illustrating the configuration of an angle detection device 1 in one embodiment of the present invention. As illustrated in FIG. 1, the angle detection device 1 is a device that detects a mechanical angle (rotation angle) of a rotor shaft 110 that is a rotation shaft of a motor 100. In the present embodiment, the motor 100 is, for example, an inner rotor type three-phase brushless DC motor. The motor 100 includes a rotor shaft 110 and a sensor magnet 120.

The sensor magnet 120 is a disk-shaped magnet attached to the rotor shaft 110. The sensor magnet 120 rotates in synchronization with the rotor shaft 110. The sensor magnet 120 has P (P is an integer of 1 or more) magnetic pole pairs. In the present embodiment, as an example, the sensor magnet 120 has four magnetic pole pairs. The magnetic pole pair means a pair of an N pole and an S pole. That is, in the present embodiment, the sensor magnet 120 has four pairs of N poles and S poles, and has a total of eight magnetic poles.

The angle detection device 1 includes a sensor group 10 and a signal processing unit 20. Although not illustrated in FIG. 1, a circuit board is mounted on the motor 100, and the sensor group 10 and the signal processing unit 20 are disposed on the circuit board. The sensor magnet 120 is disposed at a position not interfering with the circuit board. The sensor magnet 120 may be disposed inside a housing of the motor 100 or may be disposed outside the housing.

The sensor group 10 includes three magnetic sensors 11, 12, and 13. On the circuit board, the magnetic sensors 11, 12, and 13 face the sensor magnet 120 and are disposed at predetermined intervals along the rotation direction of the sensor magnet 120. In the present embodiment, the magnetic sensors 11, 12, and 13 are disposed at 30° intervals along the rotation direction of the sensor magnet 120. Each of the magnetic sensors 11, 12, and 13 is an analog output type magnetic sensor including a magnetoresistive element such as a Hall element or a linear Hall IC.

When the rotor shaft 110 rotates, the sensor magnet 120 rotates in synchronization with the rotor shaft 110. Each of the three magnetic sensors 11, 12, and 13 detects a magnetic flux change due to the rotation of the rotor shaft 110, that is, the rotation of the sensor magnet 120, and outputs an analog signal indicating a detection result of the magnetic flux change to the signal processing unit 20.

One electrical angle cycle of each analog signal output from the magnetic sensors 11, 12, and 13 corresponds to 1/P of one mechanical angle cycle. In the present embodiment, since the number of pole pairs P of the sensor magnet 120 is "4", one electrical angle cycle of each analog signal corresponds to ¼ of one mechanical angle cycle, that is, 90° in the mechanical angle. The analog signals output from the magnetic sensors 11, 12, and 13 have a phase difference of 120° from one another in electrical angle.

Hereinafter, each analog signal output from the three magnetic sensors 11, 12, and 13 to the signal processing unit 20 is referred to as a sensor signal. In the following description, the sensor signal output from the magnetic sensor 11 may be referred to as a U-phase sensor signal Hu, the sensor signal output from the magnetic sensor 12 may be referred to as a V-phase sensor signal Hv, and the sensor signal output from the magnetic sensor 13 may be referred to as a W-phase sensor signal Hw.

The signal processing unit 20 is a signal processing circuit that processes sensor signals output from the three magnetic sensors 11, 12, and 13. The signal processing unit 20 estimates the mechanical angle of the rotor shaft 110, which is the rotation shaft, based on the U-phase sensor signal Hu output from the magnetic sensor 11, the V-phase sensor signal Hv output from the magnetic sensor 12, and the W-phase sensor signal Hw output from the magnetic sensor 13. The signal processing unit 20 includes a processing unit 21 and a storage unit 22.

The processing unit 21 is a microprocessor such as a microcontroller unit (MCU), for example. The U-phase sensor signal Hu output from the magnetic sensor 11, the V-phase sensor signal Hv output from the magnetic sensor 12, and the W-phase sensor signal Hw output from the magnetic sensor 13 are input to the processing unit 21. The processing unit 21 is communicably connected to the storage unit 22 via a communication bus (not illustrated). The processing unit 21 executes at least the following two processing according to a program stored in the storage unit 22.

The processing unit 21 executes learning processing of acquiring learning data necessary for estimating the mechanical angle of the rotor shaft 110 as offline processing. The offline processing is processing executed before the angle detection device 1 is shipped from a manufacturing factory or before the angle detection device 1 is incorporated in a system on the customer side and is actually operated. In the learning processing, the processing unit 21 acquires learning data based on the sensor signals Hu, Hv, and Hw output from the magnetic sensors 11, 12, and 13 and an output signal AS of an encoder 200 (see FIG. 1). The encoder 200 is installed on the rotor shaft 110 only when the learning processing is performed. The output signal AS of the encoder 200 is a signal indicating a mechanical angle of the rotor shaft 110. The encoder 200 may be either an incremental encoder or an absolute encoder.

In addition, the processing unit 21 executes, as online processing, angle estimation processing of estimating a mechanical angle of the rotor shaft 110 based on the sensor signals Hu, Hv, and Hw output from the magnetic sensors 11, 12, and 13 and learning data obtained by the learning processing. The online processing is processing executed when the angle detection device 1 is incorporated in a system on the customer side and is actually operated.

The storage unit 22 includes a nonvolatile memory that stores programs necessary for causing the processing unit 21 to execute various processing, various setting data, the above-described learning data, and the like, and a volatile memory used as a temporary storage destination of data when the processing unit 21 executes various processing. The nonvolatile memory is, for example, an electrically erasable programmable read-only memory (EEPROM), a flash memory, or the like. The volatile memory is, for example, a random access memory (RAM) or the like.

Hereinafter, before describing learning processing and angle estimation processing executed by the processing unit 21 of the angle detection device 1 configured as described above, a position estimation method disclosed in JP 6233532 B2 will be briefly described in order to facilitate understanding of the present invention. In the following description, the position estimation method disclosed in JP 6233532 B2 may be referred to as a basic patent method. For details of the basic patent method, refer to JP 6233532 B2. In the following, for convenience of description, the basic patent method will be described using each element illustrated in FIG. 1.

First, learning processing executed by the processing unit 21 in the basic patent method will be described.

The processing unit 21 acquires signals output from the magnetic sensors 11, 12, and 13 as the sensor signals Hu, Hv, and Hw in a state where the sensor magnet 120 is rotated together with the rotor shaft 110. Specifically, an A/D converter is built in the processing unit 21, and the processing unit 21 acquires digital values of the U-phase sensor signal Hu, the V-phase sensor signal Hv, and the W-phase sensor signal Hw by digitally converting each of the U-phase sensor signal Hu, the V-phase sensor signal Hv, and the W-phase sensor signal Hw at a predetermined sampling frequency by the A/D converter.

At the time of execution of the learning processing, the rotor shaft 110 may be rotated by controlling energization of the motor 100 via a motor control device (not illustrated). Alternatively, the rotor shaft 110 may be connected to a rotating machine not illustrated, and the rotating machine may rotate the rotor shaft 110.

Figure 2:
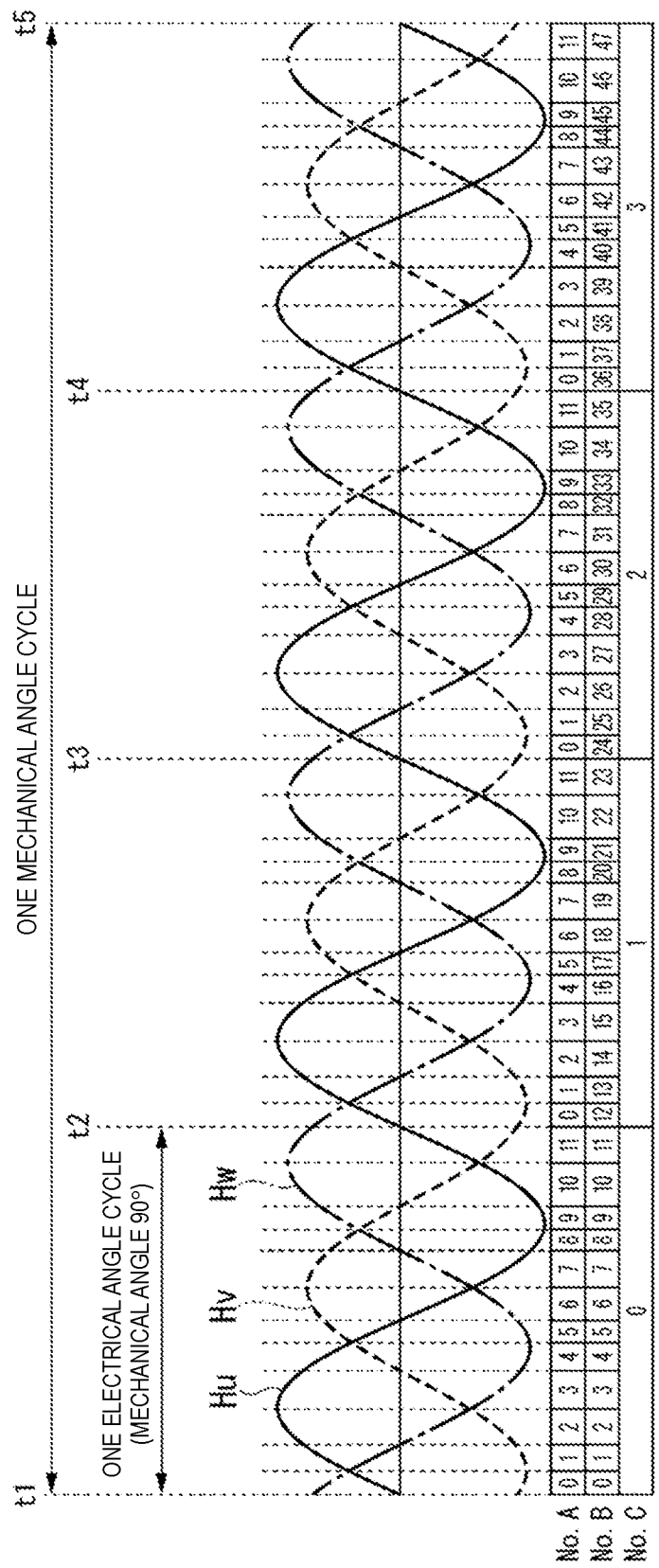
FIG. 2 is a diagram illustrating an example of waveforms of a U-phase sensor signal Hu, a V-phase sensor signal Hv, and a W-phase sensor signal Hw.

FIG. 2 is a diagram illustrating an example of waveforms of the U-phase sensor signal Hu, the V-phase sensor signal Hv, and the W-phase sensor signal Hw. As illustrated in FIG. 2, one electrical angle cycle of each of the sensor signals Hu, Hv, and Hw corresponds to ¼ of one mechanical angle cycle, that is, 90° in terms of the mechanical angle. In FIG. 2, a period from time t1 to time t5 corresponds to one mechanical angle cycle (360° in mechanical angle). In FIG. 2, the period from time t1 to time t2, the period from time t2 to time t3, the period from time t3 to time t4, and the period from time t4 to time t5 each correspond to 90° in mechanical angle. The sensor signals Hu, Hv, and Hw have a phase difference of 120° in electrical angle with one another.

Based on the digital values of the sensor signals Hu, Hv, and Hw, the processing unit 21 extracts an intersection point at which two sensor signals among the three sensor signals intersect each other and a zero-cross point at which each of the three sensor signals intersects a reference signal level over one mechanical angle cycle. The reference signal level is, for example, a ground level. When the reference signal level is the ground level, the digital value of the reference signal level is "0".

As illustrated in FIG. 2, the processing unit 21 divides one mechanical angle cycle into four pole pair regions associated with pole pair numbers based on the extraction result of the zero-cross point. In FIG. 2, "No. C" indicates the pole pair number. As illustrated in FIG. 1, pole pair numbers are assigned in advance to the four magnetic pole pairs of the sensor magnet 120.

For example, a magnetic pole pair provided in a range of 0° to 90° in mechanical angle is assigned a pole pair number "0". A magnetic pole pair provided in the range of 90° to 180° in mechanical angle is assigned a pole pair number "1". A magnetic pole pair provided in the range of 180° to 270° in mechanical angle is assigned a pole pair number "2". A magnetic pole pair provided in the range of 270° to 360° in mechanical angle is assigned a pole pair number "3".

For example, in a case where the sensor signal Hu is used as a reference, the processing unit 21 recognizes the zero-cross point obtained at the sampling timing (time t1) at which the mechanical angle is 0° among the zero-cross points of the sensor signal Hu as the start point of the pole pair region associated with the pole pair number "0". In addition, the processing unit 21 recognizes the zero-cross point obtained at the sampling timing (time t2) at which the mechanical angle is 90° among the zero-cross points of the sensor signal Hu as the end point of the pole pair region associated with the pole pair number "0". That is, the processing unit 21 determines the interval between the zero-cross point obtained at the time t1 and the zero-cross point obtained at the time t2 as the pole pair region associated with the pole pair number "0".

The processing unit 21 also recognizes the zero-cross point obtained at the sampling timing (time t2) at which the mechanical angle is 90° among the zero-cross points of the sensor signal Hu as the start point of the pole pair region associated with the pole pair number "1". Further, the processing unit 21 recognizes the zero-cross point obtained at the sampling timing (time t3) having the mechanical angle of 180° among the zero-cross points of the sensor signal Hu as the end point of the pole pair region associated with the pole pair number "1". That is, the processing unit 21 determines the interval between the zero-cross point obtained at the time t2 and the zero-cross point obtained at the time t3 as the pole pair region associated with the pole pair number "1".

The processing unit 21 also recognizes the zero-cross point obtained at the sampling timing (time t3) at which the mechanical angle is 180° among the zero-cross points of the sensor signal Hu as the start point of the pole pair region associated with the pole pair number "2". In addition, the processing unit 21 recognizes the zero-cross point obtained at the sampling timing (time t4) having the mechanical angle of 270° among the zero-cross points of the sensor signal Hu as the end point of the pole pair region associated with the pole pair number "2". That is, the processing unit 21 determines the interval between the zero-cross point obtained at the time t3 and the zero-cross point obtained at the time t4 as the pole pair region associated with the pole pair number "2".

The processing unit 21 also recognizes the zero-cross point obtained at the sampling timing (time t4) at which the mechanical angle is 270° among the zero-cross points of the sensor signal Hu as the start point of the pole pair region associated with the pole pair number "3". In addition, the processing unit 21 recognizes the zero-cross point obtained at the sampling timing (time t5) having the mechanical angle of 360° among the zero-cross points of the sensor signal Hu as the end point of the pole pair region associated with the pole pair number "3". That is, the processing unit 21 determines the interval between the zero-cross point obtained at time t4 and the zero-cross point obtained at time t5 as the pole pair region associated with the pole pair number "3".

As illustrated in FIG. 2, the processing unit 21 divides each of the four pole pair regions into 12 sections associated with section numbers based on the extraction results of the intersection point and the zero-cross point. In FIG. 2, "No. A" indicates a section number associated with each section. As illustrated in FIG. 2, the 12 sections included in each of the four pole pair regions are assigned with the section numbers from "0" to "11".

Figure 3:
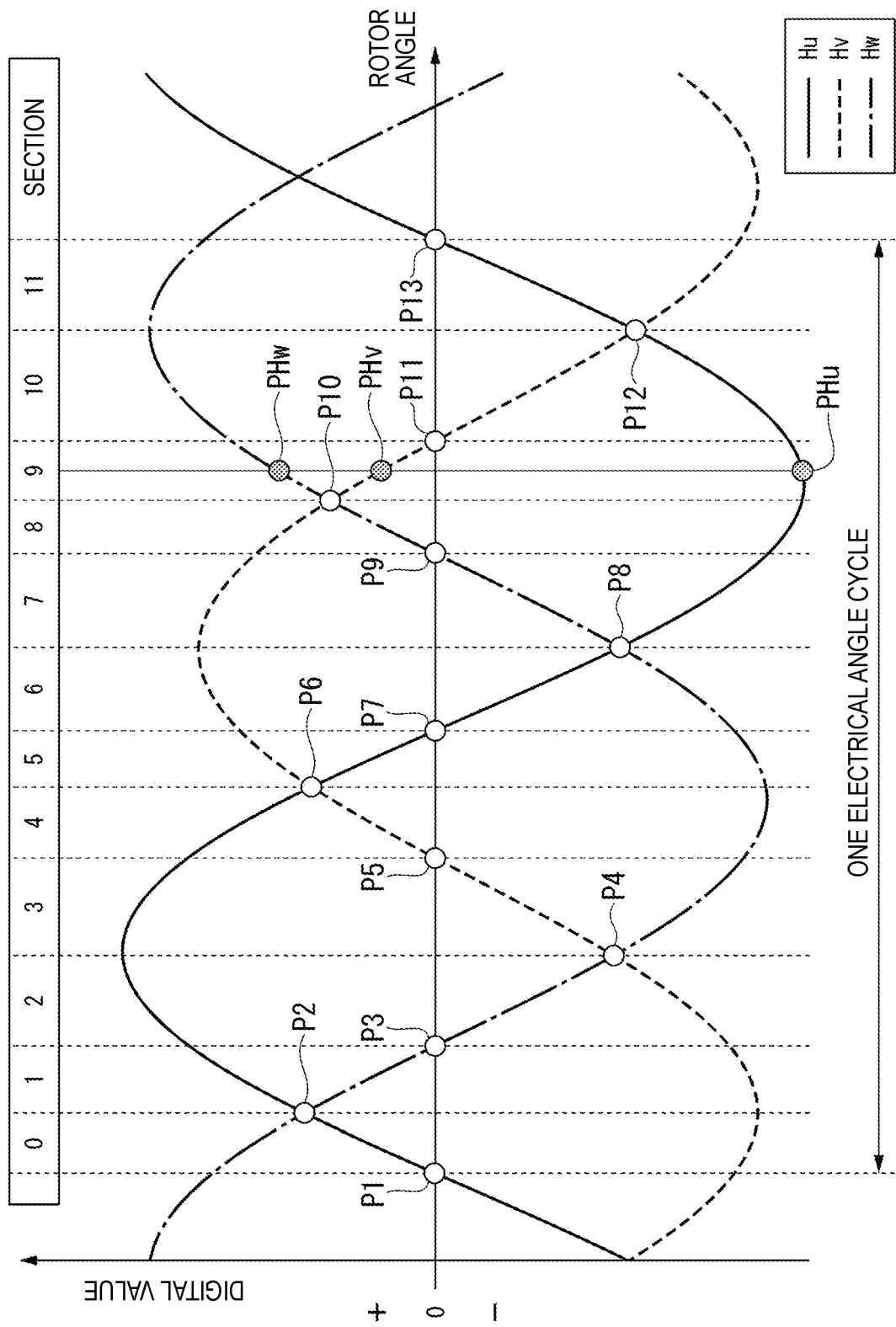
FIG. 3 is an enlarged view of the U-phase sensor signal Hu, the V-phase sensor signal Hv, and the W-phase sensor signal Hw included in one pole pair region illustrated in FIG. 2.

FIG. 3 is an enlarged view of sensor signals Hu, Hv, and Hw included in one pole pair region illustrated in FIG. 2. In FIG. 3, the reference value (reference signal level) of the amplitude is "0". In FIG. 3, the digital value of amplitude that is a positive value represents a digital value of the magnetic field strength of the N pole, as an example. The digital value of amplitude that is a negative value represents a digital value of the magnetic field strength of the S pole, as an example.

In FIG. 3, points P1, P3, P5, P7, P9, P11, and P13 are zero-cross points extracted from the digital values of the sensor signals Hu, Hv, and Hw included in one pole pair region. In FIG. 3, points P2, P4, P6, P8, P10, and P12 are intersection points extracted from the digital values of the sensor signals Hu, Hv, and Hw included in one pole pair region. As illustrated in FIG. 3, the processing unit 21 determines, as a section, an interval between the zero-cross point and the intersection point adjacent to each other.

The processing unit 21 determines the interval between the zero-cross point P1 and the intersection point P2 as a section assigned with the section number "0". The processing unit 21 determines the interval between the intersection point P2 and the zero-cross point P3 as a section assigned with the section number "1". The processing unit 21 determines the interval between the zero-cross point P3 and the intersection point P4 as a section assigned with the section number "2". The processing unit 21 determines the interval between the intersection point P4 and the zero-cross point P5 as a section assigned with the section number "3". The processing unit 21 determines the interval between the zero-cross point P5 and the intersection point P6 as a section assigned with the section number "4". The processing unit 21 determines the interval between the intersection point P6 and the zero-cross point P7 as a section assigned with the section number "5".

The processing unit 21 determines the interval between the zero-cross point P7 and the intersection point P8 as a section assigned with the section number "6". The processing unit 21 determines the interval between the intersection point P8 and the zero-cross point P9 as a section assigned with the section number "7". The processing unit 21 determines the interval between the zero-cross point P9 and the intersection point P10 as a section assigned with the section number "8". The processing unit 21 determines the interval between the intersection point P10 and the zero-cross point P11 as a section assigned with the section number "9". The processing unit 21 determines the interval between the zero-cross point P11 and the intersection point P12 as a section assigned with the section number "10". The processing unit 21 determines the interval between the intersection point P12 and the zero-cross point P13 as the section assigned with the section number "11".

Note that in the following description, for example, the section assigned with the section number "0" will be referred to as "0th section", and the section assigned with the section number "11" will be referred to as "11th section".

As illustrated in FIG. 2, a number continuous over the entire period of one mechanical angle cycle is associated with each section number as a segment number. In FIG. 2, "No. B" indicates a segment number associated with each section number. The segment is a term representing a straight line connecting an intersection point and a zero-cross point adjacent to each other. In other words, a straight line connecting the start point and the end point of each section is called a segment. In FIG. 3, for example, the start point of the 0th section is a zero-cross point P1, and the end point of the 0th section is an intersection point P2. Therefore, the segment corresponding to the 0th section is a straight line connecting the zero-cross point P1 and the intersection point P2. Similarly, in FIG. 3, for example, the start point of the 1st section is an intersection point P2, and the end point of the 1st section is a zero-cross point P3. Therefore, the segment corresponding to the 1st section is a straight line connecting the intersection point P2 and the zero-cross point P3.

As illustrated in FIG. 2, in the pole pair region associated with the pole pair number "0", the section numbers "0" to "11" are associated with the segment numbers "0" to "11". In the pole pair region associated with the pole pair number "1", the section numbers "0" to "11" are associated with the segment numbers "12" to "23". In the pole pair region associated with the pole pair number "2", the section numbers "0" to "11" are associated with the segment numbers "24" to "35". In the pole pair region associated with the pole pair number "3", the section numbers "0" to "11" are associated with the segment numbers "36" to "47".

Note that, in the following description, for example, a segment to which the segment number "0" is assigned will be referred to as a "1st segment", and a segment to which a segment number "11" is assigned will be referred to as a "11th segment".

The processing unit 21 generates a linear function $\theta(\Delta x)$ representing each segment. $\Delta x$ is a length (digital value) from the start point of the segment to any point on the segment, and $\theta$ is a mechanical angle corresponding to any point on the segment. In FIG. 3, for example, the start point of the segment corresponding to the 0th section is the zero-cross point P1, and the end point of the segment corresponding to the 0th section is the intersection point P2. Similarly, in FIG. 3, for example, the start point of the segment corresponding to the 1st section is the intersection point P2, and the end point of the segment corresponding to the 1st section is the zero-cross point P3.

For example, the linear function $\theta(\Delta x)$ representing the segment is expressed by the following Expression (1). In the following Expression (1), "i" is a segment number and is an integer from 0 to 47. In the following description, the linear function $\theta(\Delta x)$ expressed by the following Expression (1) may be referred to as a mechanical angle estimation expression, and the mechanical angle $\theta$ calculated by the following Expression (1) may be referred to as a mechanical angle estimation value.

$$\theta(\Delta x) = k[i] \times \Delta x + \theta res[i] \qquad (1)$$

In the above Expression (1), k[i] is a coefficient called a normalization coefficient. In other words, k[i] is a coefficient representing the slope of the ith segment. The normalization coefficient k[i] is expressed by the following Expression (2). In the following Expression (2), $\Delta X norm[i]$ is a deviation of the digital value between the start point and the end point of the ith segment. In FIG. 3, for example, $\Delta X norm[i]$ of the segment corresponding to the 0th section is the deviation of the digital value between the zero-cross point P1 and the intersection point P2. Similarly, in FIG. 3, for example, ΔXnorm[i] of the segment corresponding to the 1st section is the deviation of the digital value between the intersection point P2 and the zero-cross point P3.

$$k[i]=\theta\text{norm}[i]/\Delta X\text{norm}[i] \qquad (2)$$

In the above Expression (2), θnorm[i] is a deviation of the mechanical angle between the start point and the end point of the ith segment, and is expressed by the following Expression (3). In the following Expression (3), t[i] is the time between the start point and the end point of the ith segment, t[0] is the time between the start point and the end point of the 0th segment, and t[47] is the time between the start point and the end point of the 47th segment. In FIG. 3, for example, when the segment corresponding to the 0th section is the 0th segment, t[0] is the time between the zero-cross point P1 and the intersection point P2.

$$\theta\text{norm}[i]=\{t[i]/(t[0]+\ldots+t[47])\}\times 360\ [\text{degM}] \qquad (3)$$

In the above Expression (1), θres[i] is a constant called an angle reset value of the ith segment (an intercept of the linear function θ(Δx)). When the segment number "i" is "0", the angle reset value θres[i] is expressed by the following Expression (4). When the segment number "i" is any one of "1" to "47", the angle reset value θres[i] is expressed by the following Expression (5). Instead of obtaining θnorm[i] from t[i] as described above, θnorm[i] may be obtained from the mechanical angle true value (mechanical angle indicated, for example, by an output signal of an encoder attached to the rotor shaft 110).

$$\theta\text{res}[i]=0\ [\text{degM}] \qquad (4)$$

$$\theta\text{res}[i]=\Sigma(\theta\text{norm}[i-1]) \qquad (5)$$

By performing the learning processing as described above, the processing unit 21 acquires the correspondence relationship among the pole pair number, the section number, and the segment number, the feature data of each section, and the mechanical angle estimation expression of each segment, and stores the acquired data in the storage unit 22 as learning data. Note that the feature data of each section is a magnitude relationship among the digital values of the sensor signals Hu, Hv, and Hw included in each section, positive and negative signs, and the like. In addition, the normalization coefficient k[i] and the angle reset value θres[i] constituting the mechanical angle estimation expression of each segment are stored in the storage unit 22 as learning data.

Next, angle estimation processing executed by the processing unit 21 in the basic patent method will be described.

The processing unit 21 acquires the sensor signals Hu, Hv, and Hw output from the magnetic sensors 11, 12, and 13. Specifically, the processing unit 21 acquires the digital values of the U-phase sensor signal Hu, the V-phase sensor signal Hv, and the W-phase sensor signal Hw by digitally converting each of the U-phase sensor signal Hu, the V-phase sensor signal Hv, and the W-phase sensor signal Hw at a predetermined sampling frequency by the A/D converter.

Then, the processing unit 21 specifies the current section number and pole pair number based on the digital values of the sensor signals Hu, Hv, and Hw obtained at the current sampling timing. For example, in FIG. 3, it is assumed that a point PHu located on the waveform of the U-phase sensor signal Hu, a point PHv located on the waveform of the V-phase sensor signal Hv, and a point PHw located on the waveform of the W-phase sensor signal Hw are digital values of the sensor signals Hu, Hv, and Hw obtained at the current sampling timing. The processing unit 21 specifies the current section (section number) by collating the feature data such as the magnitude relationship and the positive and negative signs of the digital values of the point PHu, the point PHv, and the point PHw with the feature data of each section included in the learning data stored in the storage unit 22. In the example of FIG. 3, the 9th section is specified as the current section. In the present specification, a method of specifying the pole pair number will not be described. For a method of specifying a pole pair number, refer to JP 6233532 B2. It is assumed that, for example, the pole pair number "2" is specified as the pole pair number at the current sampling timing.

Then, the processing unit 21 specifies the current segment number based on the specified current section number and pole pair number. For example, the processing unit 21 specifies the current segment number by an expression of "segment number=12×pole pair number+section number". As described above, it is assumed that a section number "9" is specified as the current section number, and a pole pair number "2" is specified as the current pole pair number. In this case, the processing unit 21 specifies the segment number "33" as the current segment number (see FIG. 2).

The processing unit 21 reads the normalization coefficient k[i] and the angle reset value θres[i] corresponding to the specified segment number "i" from the learning data stored in the storage unit 22, and calculates the mechanical angle estimation value θ by the mechanical angle estimation expression represented by the above Expression (1). Here, the digital value of the sensor signal corresponding to the specified segment is used as Δx to be substituted into the mechanical angle estimation expression. For example, as described above, when the segment number "33" is specified as the current segment number, the processing unit 21 reads the normalization coefficient k[33] and the angle reset value θres[33] from the storage unit 22, and substitutes the digital value (see FIG. 3) of the point PHv as Δx into the mechanical angle estimation expression to calculate the mechanical angle estimation value θ at the current sampling timing.

The above is the basic procedure for estimating the mechanical angle in the basic patent method on which the present invention is based.

Figure 4:
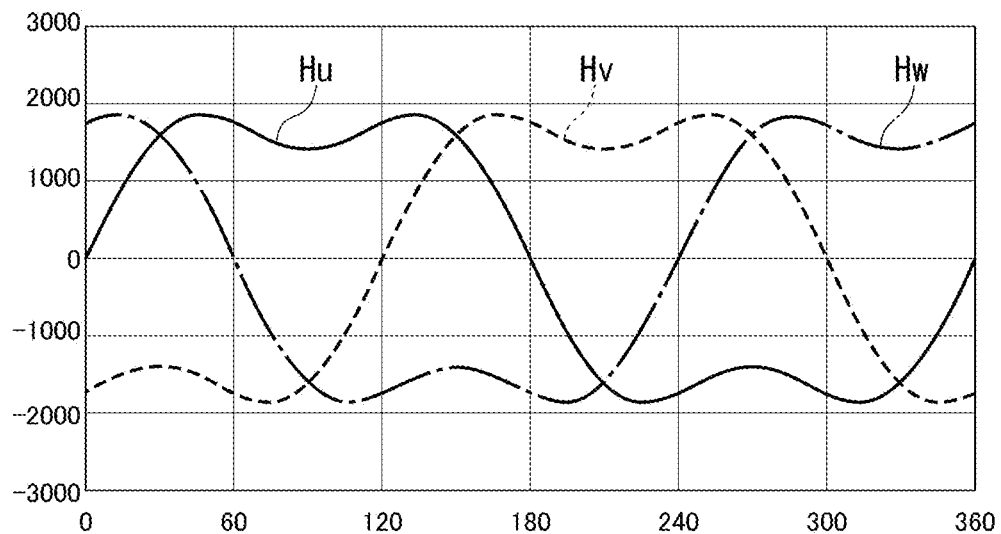
FIG. 4 is a diagram illustrating an example of waveforms of sensor signals Hu, Hv, and Hw including an in-phase signal which is a noise component.

In the basic patent method, correction processing of the sensor signals Hu, Hv, and Hw is performed in order to improve the estimation accuracy of the mechanical angle (accuracy of the mechanical angle estimation value θ). For example, as illustrated in FIG. 2, the amplitude values of the sensor signals Hu, Hv, and Hw do not necessarily coincide with each other. Furthermore, for example, as illustrated in FIG. 4, each of the sensor signals Hu, Hv, and Hw may include an in-phase signal (a DC signal, a third harmonic signal, or the like) that is a noise component. FIG. 4 is a diagram illustrating an example of waveforms of sensor signals Hu, Hv, and Hw including an in-phase signal which is a noise component. In FIG. 4, the vertical axis represents a digital value, and the horizontal axis represents an electrical angle.

Therefore, when acquiring the digital values of the sensor signals Hu, Hv, and Hw at the time of execution of the learning processing and the angle estimation processing, the processing unit 21 in the basic patent method first executes the first correction processing for removing the in-phase signals from the sensor signals Hu, Hv, and Hw based on the following Expressions (6), (7), and (8).

$$Hiu0 = Hu - (Hv + Hw)/2 \quad (6)$$

$$Hiv0 = Hv - (Hu + Hw)/2 \quad (7)$$

$$Hiw0 = Hw - (Hu + Hv)/2 \quad (8)$$

Figure 5:
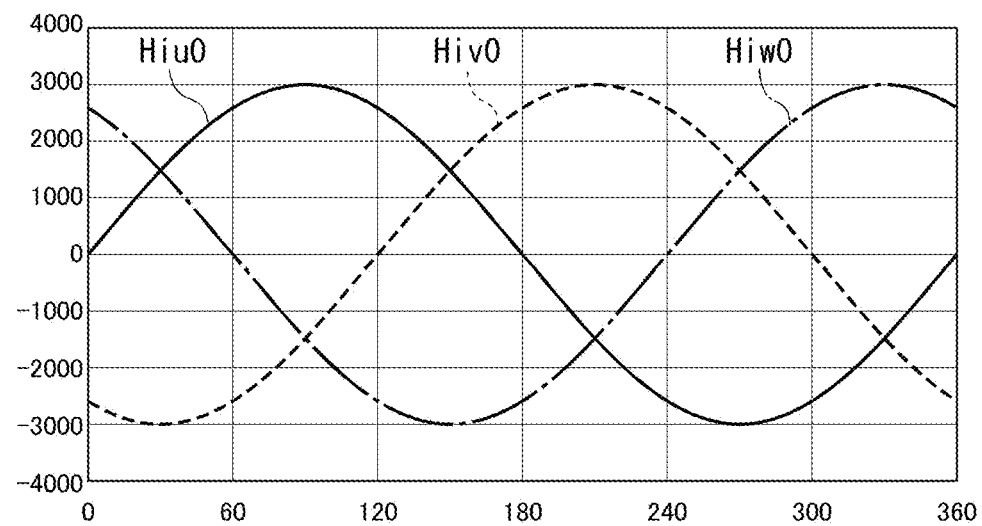
FIG. 5 is a diagram illustrating an example of waveforms of sensor signals Hiu0, Hiv0, and Hiw0 obtained after execution of first correction processing.

In Expression (6), Hiu0 is a digital value of the U-phase sensor signal obtained by performing the first correction processing on the U-phase sensor signal Hu. In Expression (7), Hiv0 is a digital value of the V-phase sensor signal obtained by performing the first correction processing on the V-phase sensor signal Hv. In Expression (8), Hiw0 is a digital value of the W-phase sensor signal obtained by performing the first correction processing on the W-phase sensor signal Hw. FIG. 5 is a diagram illustrating an example of waveforms of the sensor signals Hiu0, Hiv0, and Hiw0 obtained after execution of the first correction processing. In FIG. 5, the vertical axis represents a digital value, and the horizontal axis represents an electrical angle.

After executing the first correction processing, the processing unit 21 in the basic patent method executes the second correction processing for matching the amplitude values with respect to the sensor signals Hiu0, Hiv0, and Hiw0 based on the following Expressions (9) to (14).

$$Hiu1(ppn) = au\_max(ppn) \times Hiu1(ppn) + bu \quad (9)$$

$$Hiu1(ppn) = au\_min(ppn) \times Hiu1(ppn) + bu \quad (10)$$

$$Hiv1(ppn) = av\_max(ppn) \times Hiv0(ppn) + bv \quad (11)$$

$$Hiv1(ppn) = av\_min(ppn) \times Hiv0(ppn) + bv \quad (12)$$

$$Hiw1(ppn) = aw\_max(ppn) \times Hiw0(ppn) + bw \quad (13)$$

$$Hiw1(ppn) = aw\_min(ppn) \times Hiw0(ppn) + bw \quad (14)$$

The processing unit 21 performs the second correction processing on the positive digital value of the U-phase sensor signal Hiu0 by the above Expression (9) using the information stored in the storage unit 22. Furthermore, the processing unit 21 performs the second correction processing on the negative digital value of the U-phase sensor signal Hiu0 by the above Expression (10) using the information stored in the storage unit 22.

The processing unit 21 performs the second correction processing on the positive digital value of the V-phase sensor signal Hiv0 by the above Expression (11) using the information stored in the storage unit 22. Furthermore, the processing unit 21 performs the second correction processing on the negative digital value of the V-phase sensor signal Hiv0 by the above Expression (12) using the information stored in the storage unit 22.

The processing unit 21 performs the second correction processing on the positive digital value of the W-phase sensor signal Hiw0 by the above Expression (13) using the information stored in the storage unit 22. Furthermore, the processing unit 21 performs the second correction processing on the negative digital value of the W-phase sensor signal Hiw0 by the above Expression (14) using the information stored in the storage unit 22.

In Expressions (9) and (10), Hiu1 is a digital value of the U-phase sensor signal obtained by performing the second correction processing on the U-phase sensor signal Hiu0. In Expressions (11) and (12), Hiv1 is a digital value of the V-phase sensor signal obtained by performing the second correction processing on the V-phase sensor signal Hiv0. In Expressions (13) and (14), Hiw1 is a digital value of the W-phase sensor signal obtained by performing the second correction processing on the W-phase sensor signal Hiw0.

Figure 6:
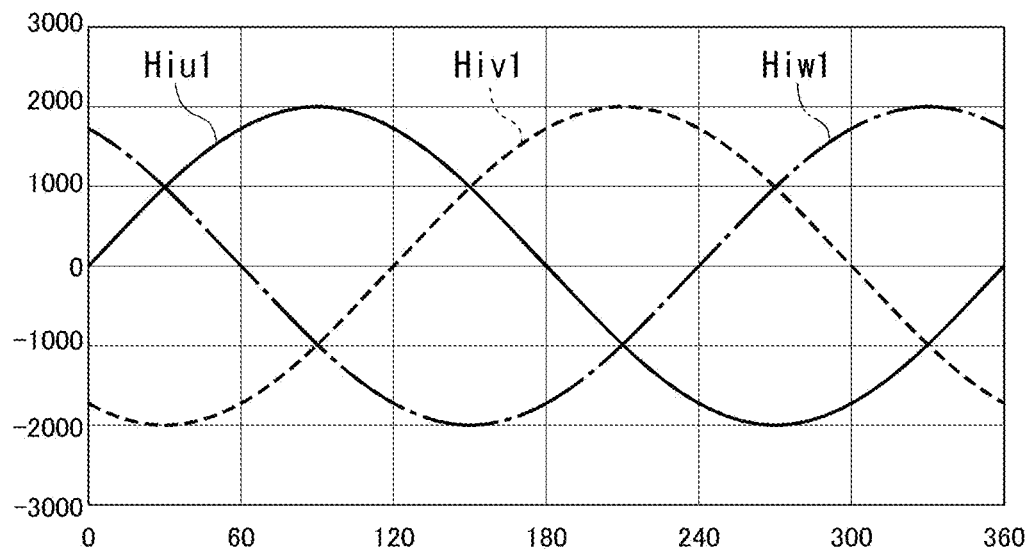
FIG. 6 is a diagram illustrating an example of waveforms of sensor signals Hiu1, Hiv1, and Hiw1 obtained after execution of second correction processing.

FIG. 6 is a diagram illustrating an example of waveforms of the sensor signals Hiu1, Hiv1, and Hiw1 obtained after execution of the second correction processing. In FIG. 6, the vertical axis represents a digital value, and the horizontal axis represents an electrical angle.

In Expressions (9) to (14), ppn is the pole pair number from 0 to 3. In Expressions (9), (11), and (13), each of au_max(ppn), av_max(ppn), and aw_max(ppn) is a positive-side gain correction value for a positive digital value of one electrical angle cycle corresponding to each magnetic pole pair stored in the storage unit 22 in advance. In Expressions (10), (12), and (14), each of au_min(ppn), av_min(ppn), and aw_min(ppn) is a negative-side gain correction value for a negative-side digital value of one electrical angle cycle corresponding to each magnetic pole pair stored in advance in the storage unit 22. In Expressions (9) to (14), bu, bv, and bw each are the offset correction values of the phases stored in the storage unit 22. Note that au_max(ppn), av_max(ppn), aw_max(ppn), au_min(ppn), av_min(ppn), and aw_min(ppn) each are correction values for each pole pair. Therefore, the number of positive-side gain correction values is 12 (=3 phases × 4 pole logarithms). Similarly, the number of negative-side gain correction values is 12.

After executing the second correction processing, the processing unit 21 in the basic patent method executes third correction processing for linearizing a part (divided signal) of the sensor signal corresponding to each segment with respect to the sensor signals Hiu1, Hiv1, and Hiw1. In FIG. 3, for example, when the segment corresponding to the 0th section is the 0th segment, the divided signal corresponding to the 0th segment is a signal of a portion connecting the zero-cross point P1 and the intersection point P2 in the U-phase sensor signal Hu. Similarly, in FIG. 3, for example, when the segment corresponding to the 1st section is the 1st segment, the divided signal corresponding to the 1st segment is a signal of a portion connecting the intersection point P2 and the zero-cross point P3 in the W-phase sensor signal Hw.

The processing unit 21 performs the third correction processing for changing the scale of each sensor signal by using a value stored in advance in the storage unit 22 as a coefficient on the sensor signals Hiu1, Hiv1, and Hiw1. By performing the third correction processing, the substantially S-shaped shape of the divided signal corresponding to each segment can be linearized. Here, the value stored in the storage unit 22 is a value designed in advance. In the third correction processing, calculation processing is performed by a correction formula such as a quadratic function, a cubic function, or a trigonometric function using a value designed in advance.

As an example, the processing unit 21 executes the third correction processing on the sensor signals Hiu1, Hiv1, and Hiw1 based on the following Expressions (15) to (17). In the following Expressions (15) to (17), a and b are coefficients stored in the storage unit 22 in advance.

$$Hiu2 = b \times \tan(a \times Hiu1) \quad (15)$$

$$Hiv2 = b \times \tan(a \times Hiv1) \quad (16)$$

$$Hiw2 = b \times \tan(a \times Hiw1) \quad (17)$$

Figure 7:
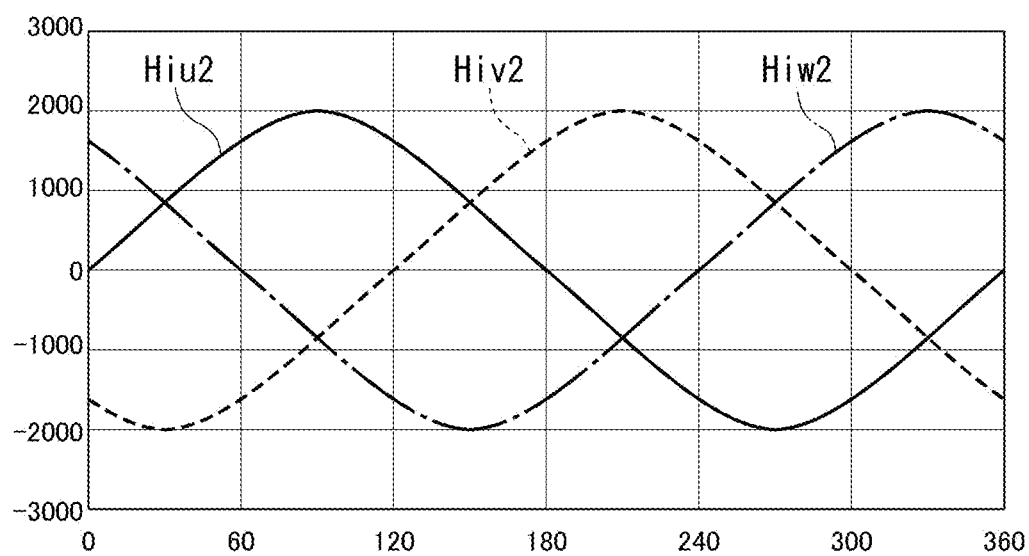
FIG. 7 is a diagram illustrating an example of waveforms of sensor signals Hiu2, Hiv2, and Hiw2 obtained after execution of third correction processing.

In Expression (15), Hiu2 is a digital value of the U-phase sensor signal obtained by performing the third correction processing on the U-phase sensor signal Hiu1. In Expression (16), Hiv2 is a digital value of the V-phase sensor signal obtained by performing the third correction processing on the V-phase sensor signal Hiv1. In Expression (17), Hiw2 is a digital value of the W-phase sensor signal obtained by performing the third correction processing on the W-phase sensor signal Hiw1. FIG. 7 is a diagram illustrating an example of waveforms of the sensor signals Hiu2, Hiv2, and Hiw2 obtained after execution of the third correction processing. In FIG. 7, the vertical axis represents a digital value, and the horizontal axis represents an electrical angle.

As described above, in the basic patent method, the in-phase noise included in the sensor signals Hu, Hv, and Hw can be reduced by the first correction processing. In addition, in the basic patent method, the mutual variation of each sensor signal can be corrected by the second correction processing. Here, the mutual variation is, for example, a variation in an amplitude value and an offset component of each sensor signal. Further, in the basic patent method, the curve portion of the waveform of each sensor signal can be linearized by the third correction processing. In particular, since the length of a part (divided signal) of the sensor signal corresponding to the segment is made uniform by performing the second correction processing, it is easy to apply uniform calculation processing to all the divided signals in the third correction processing. Therefore, by performing the second correction processing before the third correction processing, the curved portion of the waveform can be further linearized.

As a result, in the basic patent method, the signal portion (divided signal) necessary for the calculation of the mechanical angle estimation value θ based on the above Expression (1) is further linearized, and the difference between the mechanical angle estimation value θ and the mechanical angle true value (mechanical angle indicated, for example, by an output signal of an encoder attached to the rotor shaft 110) can be reduced, so that highly accurate mechanical angle estimation can be performed.

Figure 8:
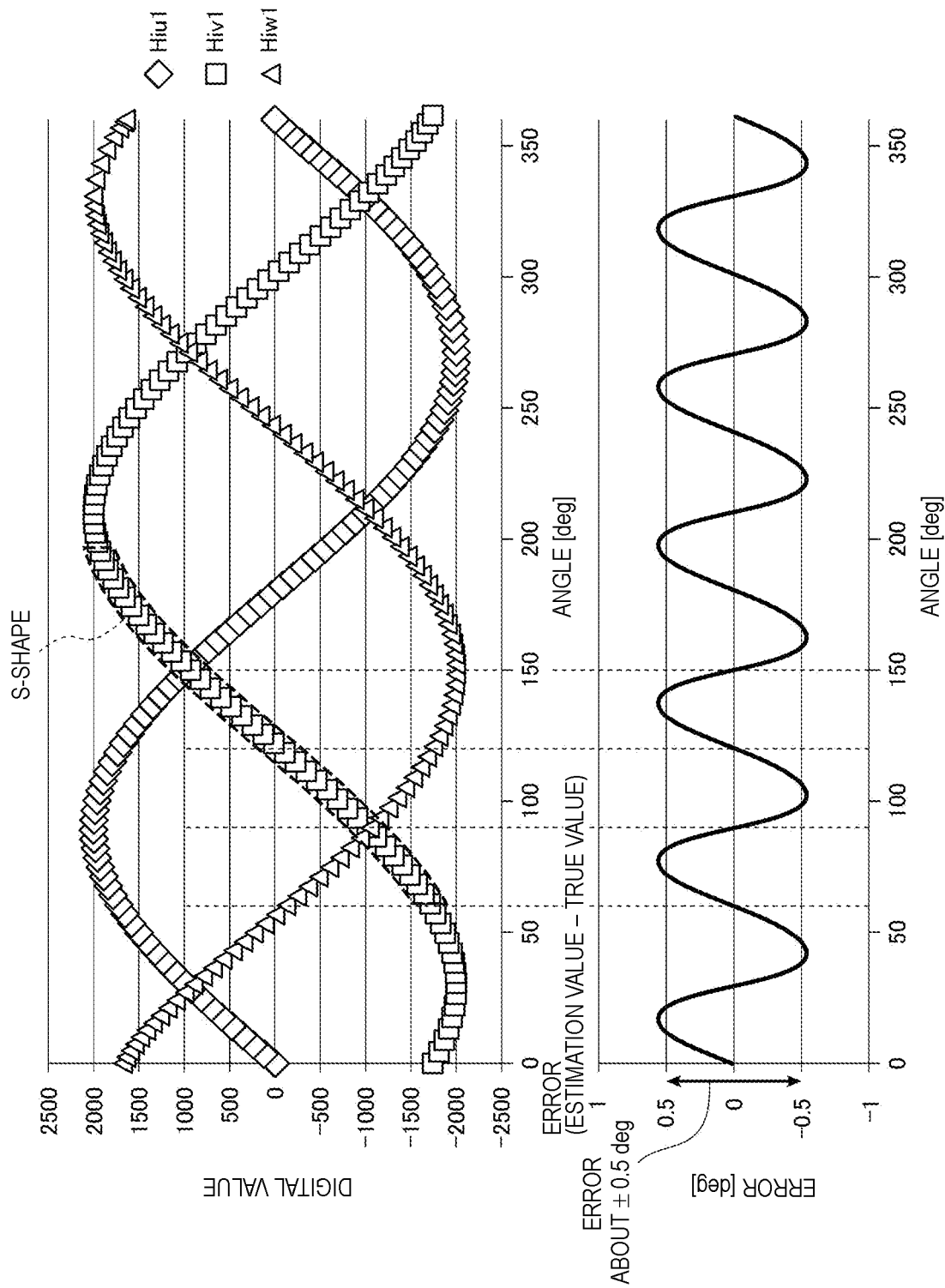
FIG. 8 is a diagram illustrating a relationship between waveforms of the sensor signals Hiu1, Hiv1, and Hiw1 and an angle error before the third correction processing is performed.
Figure 9:
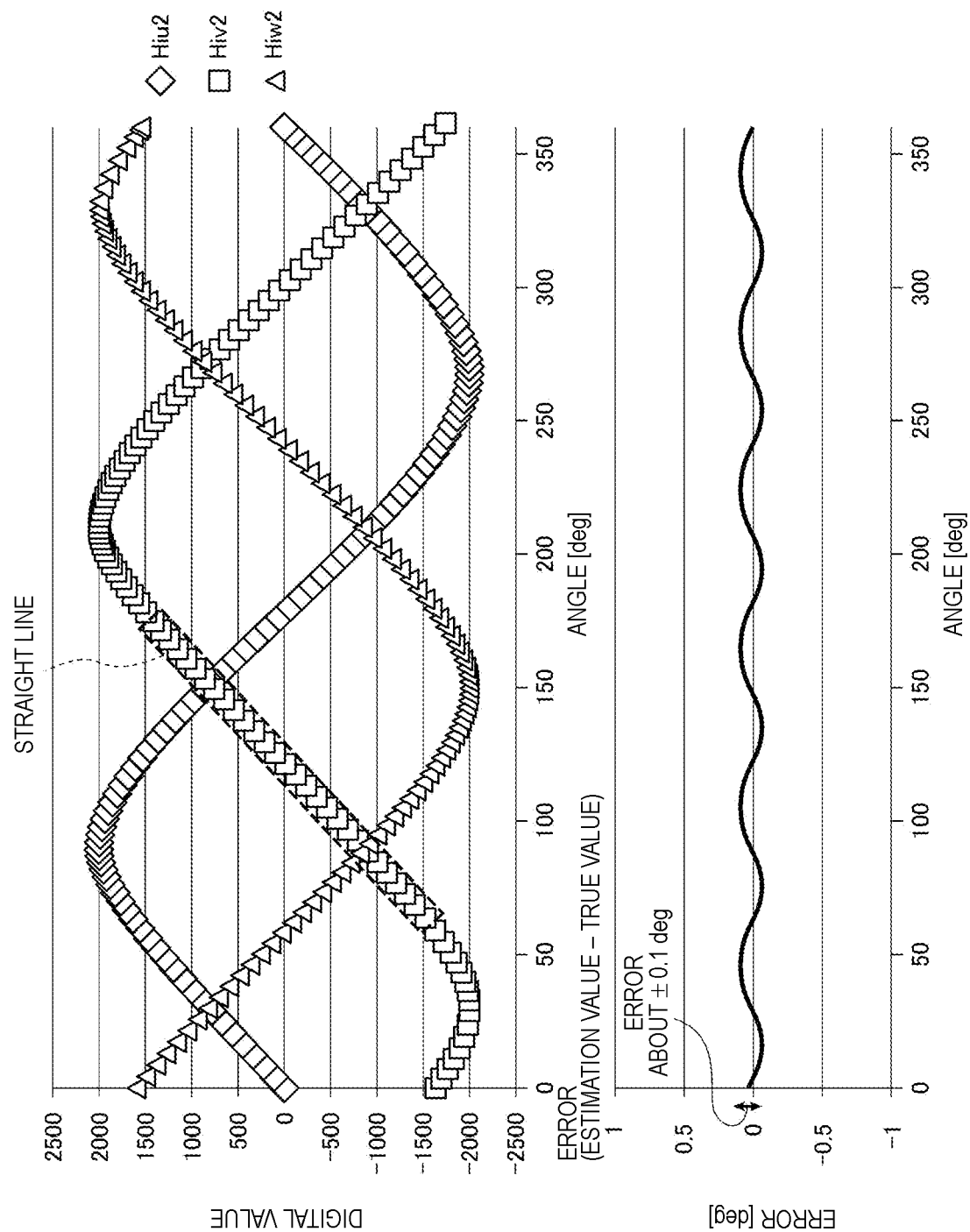
FIG. 9 is a diagram illustrating a relationship between waveforms of the sensor signals Hiu2, Hiv2, and Hiw2 and an angle error obtained after the third correction processing is performed.

FIG. 8 is a diagram illustrating the relationship between the waveforms of the sensor signals Hiu1, Hiv1, and Hiw1 and the angle error before the third correction processing is performed. FIG. 9 is a diagram illustrating a relationship between the waveforms of the sensor signals Hiu2, Hiv2, and Hiw2 obtained after the third correction processing is performed and the angle error. In FIGS. 8 and 9, the angle error is a value obtained by subtracting the mechanical angle true value (mechanical angle indicated, for example, by an output signal of an encoder attached to the rotor shaft 110) from the mechanical angle estimation value θ calculated based on the above Expression (1).

As illustrated in FIG. 8, when the mechanical angle estimation value θ is calculated based on the sensor signals Hiu1, Hiv1, and Hiw1 before the third correction processing is performed, the angle error is about ±0.5 [deg]. On the other hand, as illustrated in FIG. 9, when the mechanical angle estimation value θ is calculated based on the sensor signals Hiu2, Hiv2, and Hiw2 obtained after the third correction processing is performed, the angle error is about ±0.1 [deg]. As described above, in the basic patent method, the angle error between the mechanical angle estimation value θ and the mechanical angle true value can be reduced by linearizing the divided signal corresponding to each segment.

Figure 10:
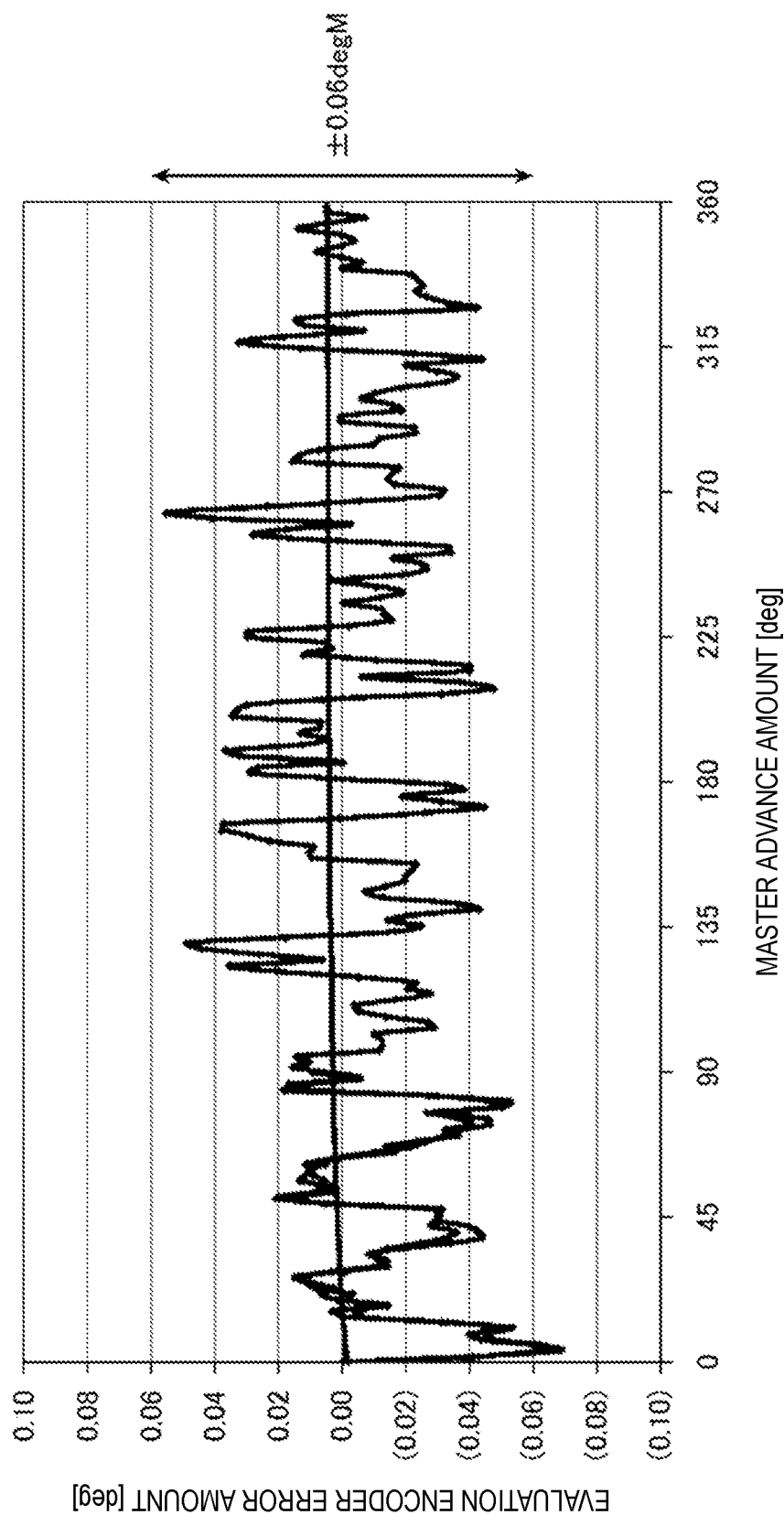
FIG. 10 is a diagram illustrating a result of actual machine verification on an evaluation encoder error amount with respect to a master advance amount using the basic patent method.

As illustrated in FIG. 10, the inventor of the present application has done an actual machine verification on the evaluation encoder error amount with respect to the master advance amount using the basic patent method, and as a result, the angle error between the mechanical angle estimation value θ and the mechanical angle true value has been within about ±0.06 [deg]. However, since the angle error increases or decreases due to a change in use environment such as temperature, the angle error may become larger depending on the use environment.

An object of the present invention is to further reduce the angle error between the mechanical angle estimation value θ and the mechanical angle true value as compared with the basic patent method described above, thereby achieving improvement in the mechanical angle detection accuracy of the rotation shaft.

Hereinafter, in order to solve the above technical problems, learning processing and angle estimation processing executed by the processing unit 21 of the angle detection device 1 according to the present embodiment will be described.

First, learning processing executed by the processing unit 21 of the angle detection device 1 according to the present embodiment will be described.

Figure 11:
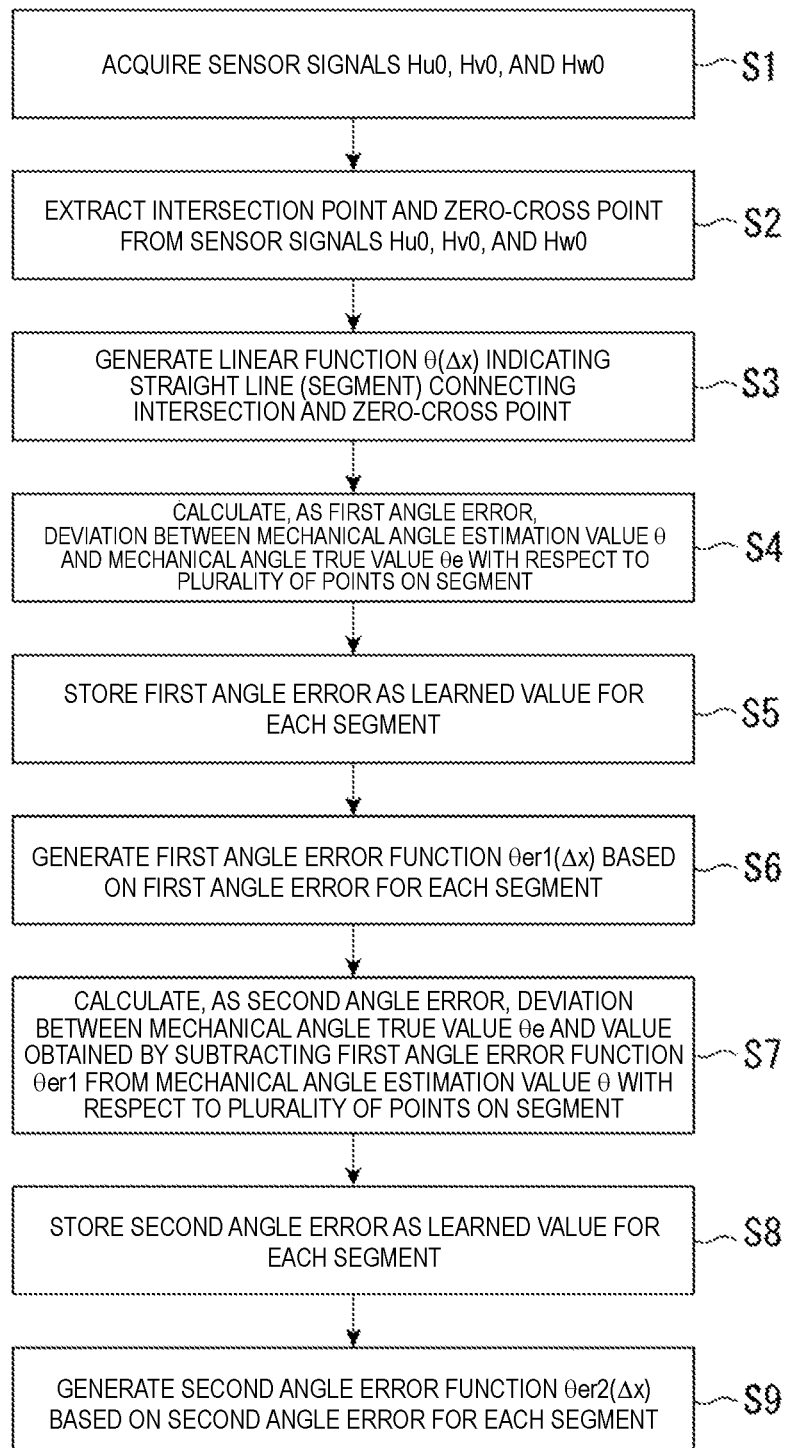
FIG. 11 is a flowchart illustrating learning processing executed as offline processing by a processing unit 21 of the angle detection device 1 according to the present embodiment.

FIG. 11 is a flowchart illustrating learning processing executed as offline processing by the processing unit 21 of the angle detection device 1 according to the present embodiment. The processing unit 21 executes learning processing of acquiring learning data necessary for estimating the mechanical angle of the rotor shaft 110 as offline processing.

As illustrated in FIG. 11, the processing unit 21 acquires signals output from the three magnetic sensors 11, 12, and 13 as sensor signals Hu, Hv, and Hw in a state where the sensor magnet 120 is rotated together with the rotor shaft 110 (step S1). Specifically, an A/D converter is built in the processing unit 21, and the processing unit 21 acquires digital values of the U-phase sensor signal Hu, the V-phase sensor signal Hv, and the W-phase sensor signal Hw by digitally converting each of the U-phase sensor signal Hu, the V-phase sensor signal Hv, and the W-phase sensor signal Hw at a predetermined sampling frequency by the A/D converter.

Subsequently, based on the digital values of the sensor signals Hu, Hv, and Hw, the processing unit 21 extracts an intersection point at which two sensor signals among the three sensor signals intersect each other and a zero-cross point at which each of the three sensor signals intersects a reference signal level over one mechanical angle cycle (step S2). Then, the processing unit 21 generates a linear function θ(Δx) representing a straight line (segment) connecting the intersection point and the zero-cross point adjacent to each other, that is, a mechanical angle estimation expression of each segment (step S3).

Since the processing from step S1 to step S3 is the same as the learning processing in the basic patent method, detailed description thereof will be omitted. Note that the first correction processing, the second correction processing, and the third correction processing in the basic patent method may be performed on the sensor signals Hu, Hv, and Hw acquired in step S1, and the processing in and after step S2 may be performed based on the sensor signals Hiu2, Hiv2, and Hiw2 obtained after the third correction processing is performed.

By executing the processing from step S1 to step S3, the processing unit 21 acquires the correspondence relationship among the pole pair number, the section number, and the segment number, the feature data of each section, and the mechanical angle estimation expression of each segment, and stores the acquired data in the storage unit 22 as learning data. Note that the feature data of each section is a magnitude relationship among the digital values of the sensor signals Hu, Hv, and Hw included in each section, positive and negative signs, and the like. In addition, the normalization coefficient k[i] and the angle reset value θres[i] constituting the mechanical angle estimation expression of each segment are stored in the storage unit 22 as learning data.

Figure 12:
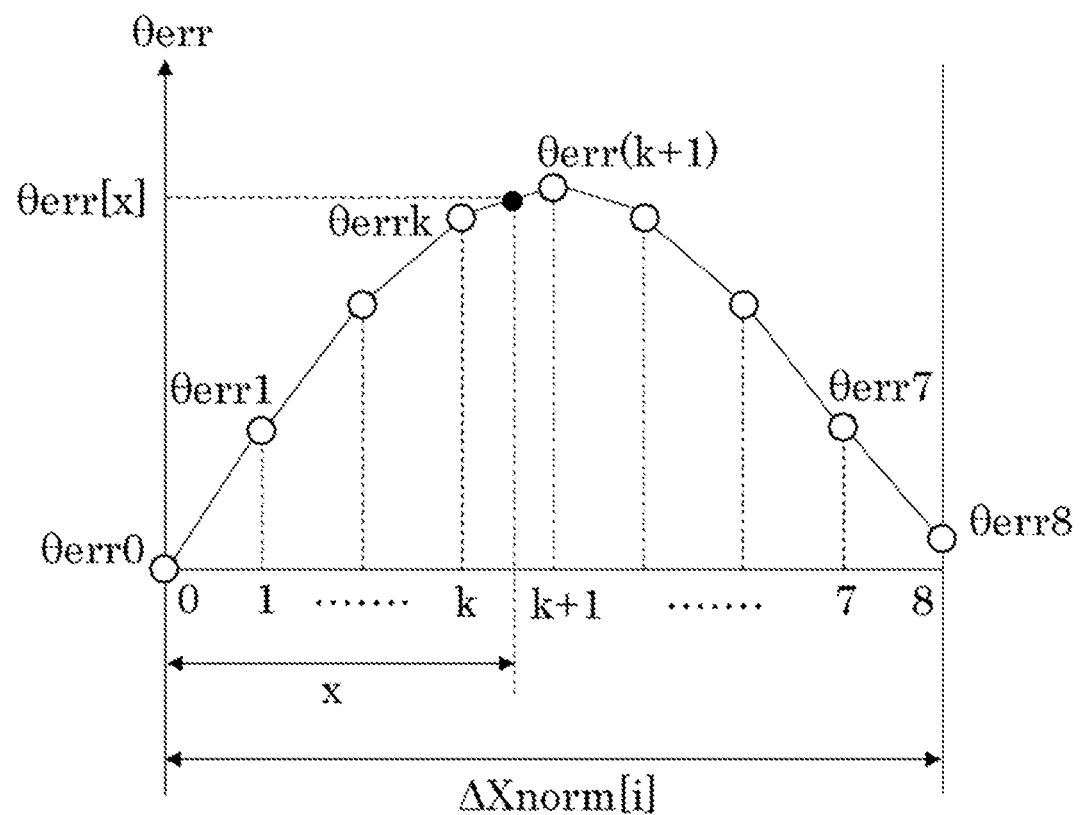
FIG. 12 is a diagram illustrating a method of calculating a deviation between a mechanical angle estimation value θ and a mechanical angle true value θe as a first angle error for a plurality of points on a segment.

Subsequently, the processing unit 21 calculates, as a first angle error, a deviation between the mechanical angle estimation value θ calculated based on the mechanical angle estimation expression and the mechanical angle θe acquired from the output signal AS of the encoder 200 installed on the rotor shaft 110 for a plurality of points on the segment (step S4). Hereinafter, the mechanical angle θe acquired from the encoder 200 may be referred to as a mechanical angle true value. As an example, as illustrated in FIG. 12, the processing unit 21 according to the present embodiment calculates a deviation between the mechanical angle estimation value θ and the mechanical angle true value θe as a first angle error θerr for nine points on the segment. Hereinafter, the nine points on the segment may be referred to as attention points.

In FIG. 12, "k" is numbers from "0" to "8" assigned to the nine attention points on the segment. Hereinafter, the attention point to which the number "k" is assigned may be referred to as a kth attention point. As illustrated in FIG. 12, the nine attention points on the segment include a start point and an end point of the segment. The 0th attention point corresponds to the start point of the segment, and the 8th attention point corresponds to the end point of the segment. The length from the 0th attention point to the 8th attention point corresponds to ΔXnorm[i], which is a deviation of the digital value between the start point and the end point of the ith segment. In the present embodiment, the intervals between the plurality of attention points on the segment are equal intervals. In other words, in the present embodiment, the segment is divided into eight equal parts by nine attention points arranged at equal intervals.

The processing unit 21 calculates the mechanical angle estimation value θ corresponding to the kth attention point by substituting "k×ΔXnorm[i]/8" into Δx of the above Expression (1), and calculates a deviation between the mechanical angle true value θe obtained from the encoder 200 at the same sampling timing as the kth attention point and the calculated mechanical angle estimation value θ as a first angle error θerrk. In FIG. 12, the first angle error θerr0 is the first angle error calculated for the 0th attention point by the above method. The first angle error θerr1 is a first angle error calculated for the 1st attention point by the above method. The first angle error θerr7 is a first angle error calculated for the 7th attention point by the above method. The first angle error θerr8 is a first angle error calculated for the 8th attention point by the above method. The processing unit 21 sequentially reads the learning data related to all the segments from the 0th segment to the 47th segment, and calculates the deviation between the mechanical angle estimation value θ and the mechanical angle true value θe as the first angle error θerr for the nine attention points on each segment.

Figure 13:
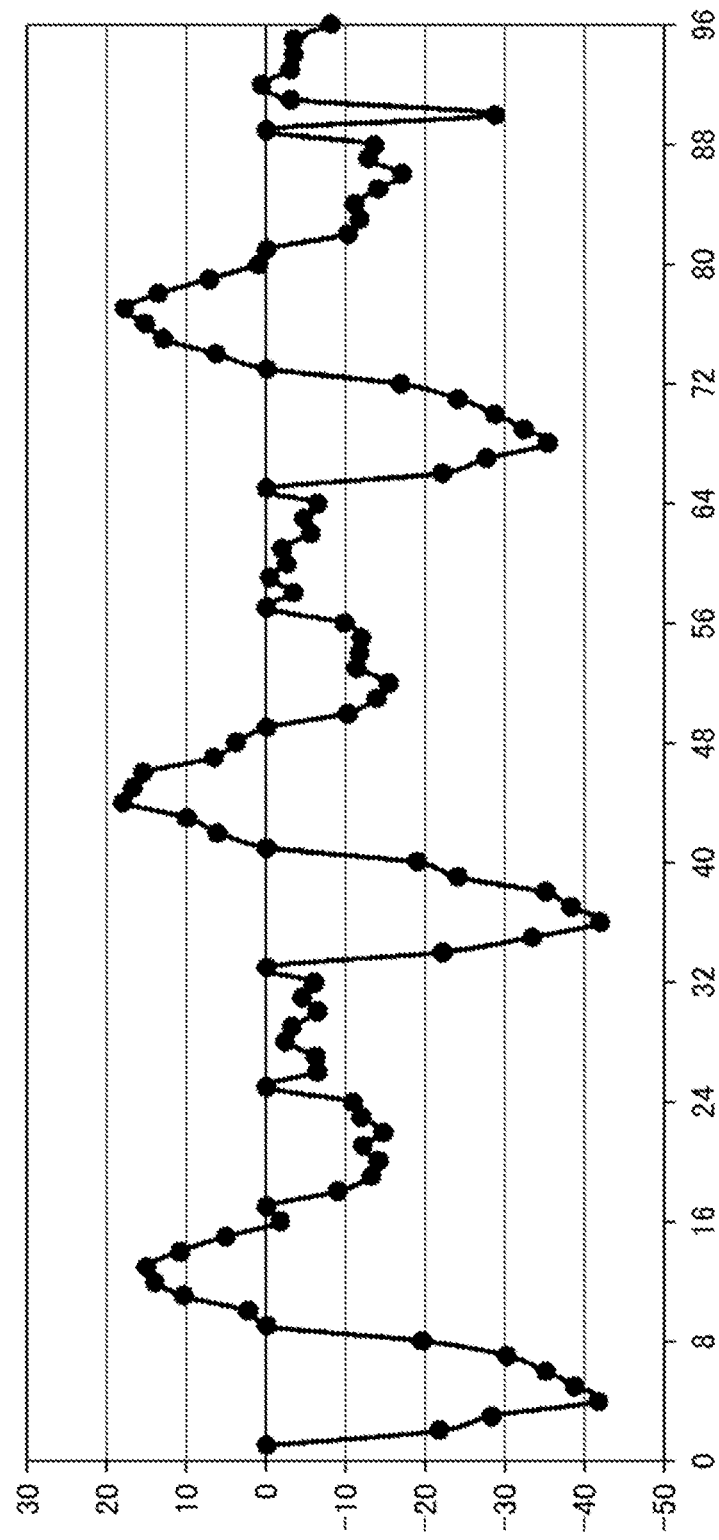
FIG. 13 is a diagram illustrating an example of a first angle error calculated for a plurality of points on 12 segments included in one pole pair region.

Since the 8 first angle errors θerr are obtained for each of the 12 segments included in one pole pair region by executing the processing in step S4 as described above, a total of 96 first angle errors θerr are obtained for one pole pair region as illustrated in FIG. 13. Therefore, a total of 384 first angle errors θerr are obtained in the entire four pole pair regions. As described above, the processing unit 21 stores the first angle error θerr calculated for the nine attention points on the segment in the storage unit 22 as a learned value for each segment (step S5).

Subsequently, the processing unit 21 generates, for each segment, a first angle error function for calculating the first angle error θerr corresponding to an arbitrary point on the segment based on the first angle errors θerr calculated for the nine attention points on the segment (step S6). The first angle error function is expressed by the following Expression (18). In the following Expression (18), "x" has the same meaning as Δx, and is a length (digital value) from the start point of the ith segment to an arbitrary point (see FIG. 12). In the following Expression (18), Xnorm has the same meaning as ΔXnorm[i].

[Math. 1]

$$\theta_{err} = \frac{\theta_{err(k+1)} - \theta_{errk}}{\frac{X_{norm}}{8}} \times \left(x - k\frac{X_{norm}}{8}\right) + \theta_{errk} \quad (18)$$

Subsequently, the processing unit 21 calculates, as a second angle error, a deviation between a value obtained by subtracting a first angle error θer1 calculated based on the first angle error function expressed by the above Expression (18) from the mechanical angle estimation value θ calculated based on the mechanical angle estimation expression for a plurality of points on the segment and the mechanical angle true value θe acquired from the encoder 200 (step S7). The plurality of points on the segment used in step S7 may be the same as or different from the nine attention points used in step S4. With the processing in step S7, it is possible to further learn the angle error (second angle error) in the state of using the first angle error obtained in step S4. For each segment, the processing unit 21 stores the second angle error calculated for the plurality of points on the segment in the storage unit 22 as a learned value (step S8).

Finally, the processing unit 21 generates, for each segment, a second angle error function for calculating a second angle error corresponding to an arbitrary point on the segment based on the second angle error calculated for a plurality of points on the segment (step S9). The second angle error function is expressed by the same expression as the above Expression (18).

The processing unit 21 acquires the correspondence relationship among the pole pair number, the section number, and the segment number, the feature data of each section, and the mechanical angle estimation expression of each segment by performing the processing from step S1 to step S3 in the learning processing as described above, and stores the acquired data in the storage unit 22 as learning data. In addition, the processing unit 21 generates a first angle error function for calculating a first angle error corresponding to an arbitrary point on each segment and a second angle error function for calculating a second angle error corresponding to an arbitrary point on each segment by performing the processing from step S4 to step S9 in the learning processing as described above, and stores each learned value necessary for the generation in the storage unit 22 as learning data.

Next, angle estimation processing executed by the processing unit 21 in the present embodiment will be described.

The processing unit 21 acquires the sensor signals Hu, Hv, and Hw output from the magnetic sensors 11, 12, and 13. Specifically, the processing unit 21 acquires the digital values of the U-phase sensor signal Hu, the V-phase sensor signal Hv, and the W-phase sensor signal Hw by digitally converting each of the U-phase sensor signal Hu, the V-phase sensor signal Hv, and the W-phase sensor signal Hw at a predetermined sampling frequency by the A/D converter.

Then, the processing unit 21 specifies the current section number and pole pair number based on the digital values of the sensor signals Hu, Hv, and Hw obtained at the current sampling timing. For example, in FIG. 3, it is assumed that a point PHu located on the waveform of the U-phase sensor signal Hu, a point PHv located on the waveform of the V-phase sensor signal Hv, and a point PHw located on the waveform of the W-phase sensor signal Hw are digital values of the sensor signals Hu, Hv, and Hw obtained at the current sampling timing. The processing unit 21 specifies the current section (section number) by collating the feature data such as the magnitude relationship and the positive and negative signs of the digital values of the point PHu, the point PHv, and the point PHw with the feature data of each section included in the learning data stored in the storage unit 22. In the example of FIG. 3, the 9th section is specified as the current section. In addition, it is assumed that, for example, the pole pair number "2" is specified as the pole pair number at the current sampling timing.

Then, the processing unit 21 specifies the current segment number based on the specified current section number and pole pair number. For example, the processing unit 21 specifies the current segment number by an expression of "segment number=12×pole pair number+section number". As described above, it is assumed that a section number "9" is specified as the current section number, and a pole pair number "2" is specified as the current pole pair number. In this case, the processing unit 21 specifies the segment number "33" as the current segment number (see FIG. 2).

The processing unit 21 reads the normalization coefficient k[i] and the angle reset value θres[i] corresponding to the specified segment number "i" from the learning data stored in the storage unit 22, and calculates the mechanical angle estimation value θ by the mechanical angle estimation expression represented by the following Expression (19). Here, the digital value of the sensor signal corresponding to the specified segment is used as Δx to be substituted into the mechanical angle estimation expression. In Expression (19), θer1 is a first angle error obtained by substituting Δx into the first angle error function obtained by the learning processing, and θer2 is a second angle error obtained by substituting Δx into the second angle error function obtained by the learning processing.

$$\theta(\Delta x)=k[i]\times\Delta x+\theta res[i]-(\theta er1+6er2) \quad (19)$$

For example, as described above, when the segment number "33" is specified as the current segment number, the processing unit 21 reads the normalization coefficient k[33] and the angle reset value θres[33] from the storage unit 22, calculates the first angle error θer1 and the second angle error θer2 corresponding to the digital value of the point PHv by substituting the digital value of the point PHv (see FIG. 3) as Δx into the first angle error function and the second angle error function, and calculates the mechanical angle estimation value θ at the current sampling timing by substituting Δx, the first angle error θer1, and the second angle error θer2 into the mechanical angle estimation expression represented by the above Expression (19).

Figure 14:
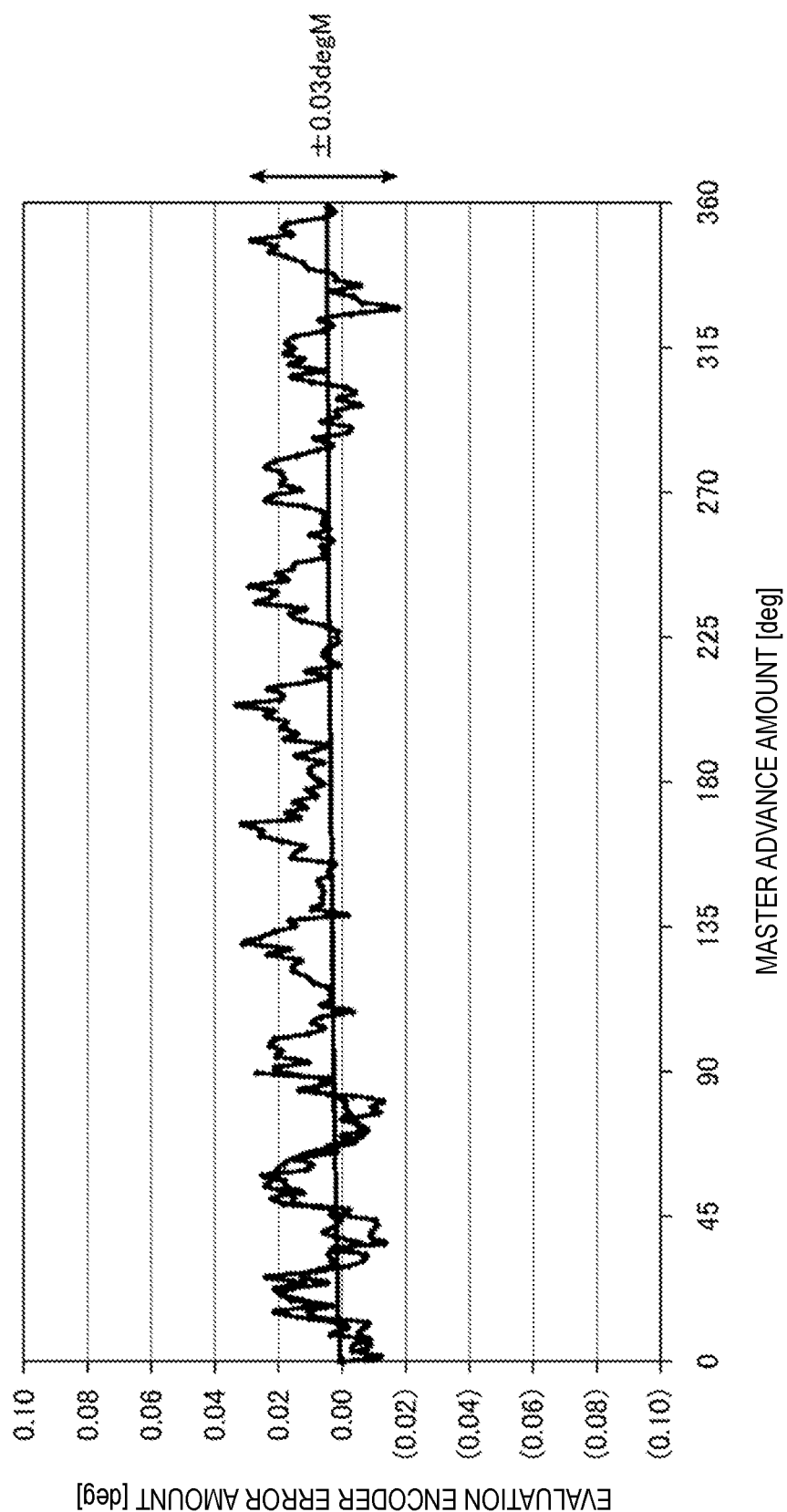
FIG. 14 is a diagram illustrating a result of actual machine verification on an evaluation encoder error amount with respect to a master advance amount when the mechanical angle estimation value θ is corrected using only the first angle error.
Figure 15:
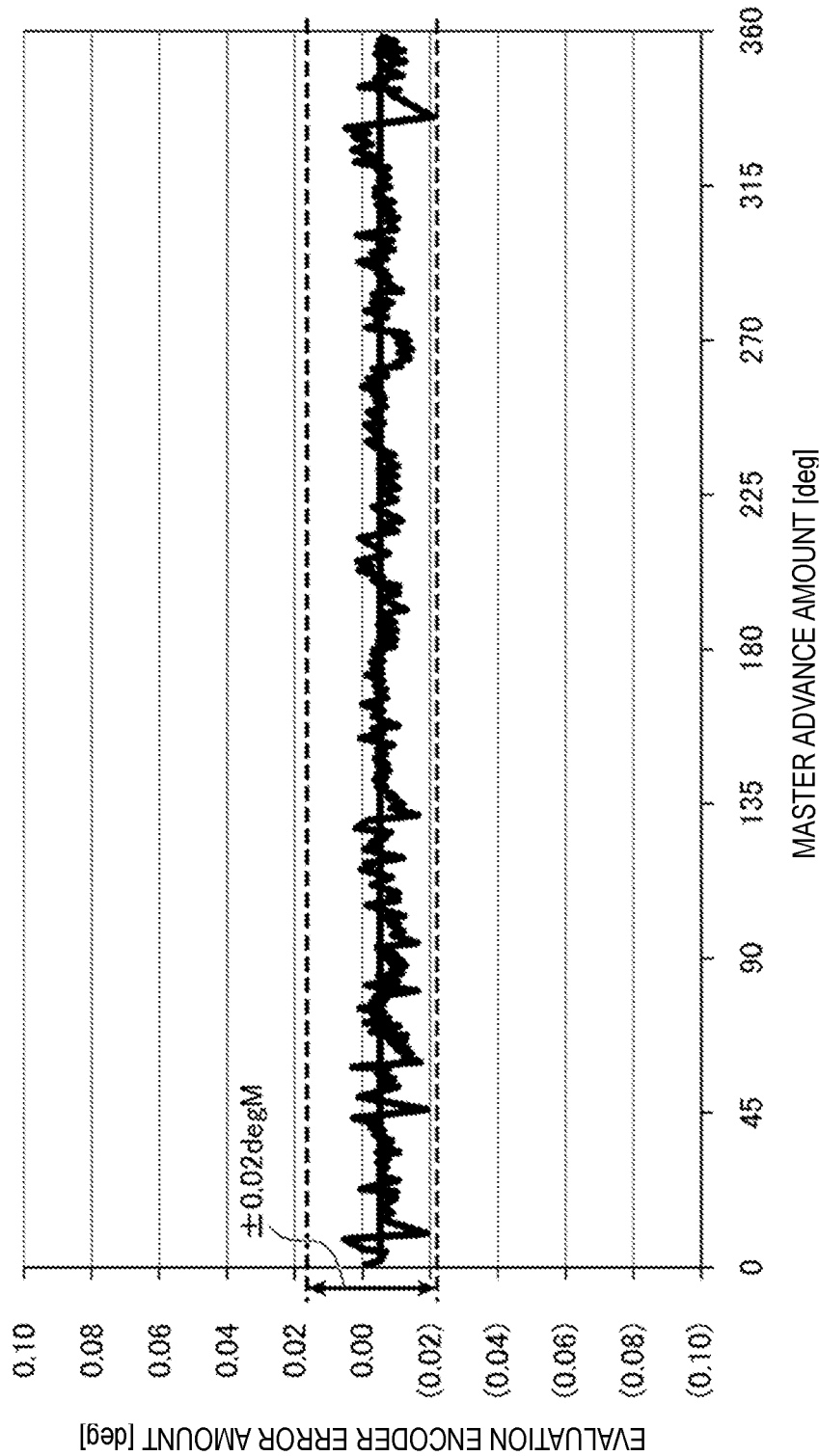
FIG. 15 is a diagram illustrating a result of actual machine verification on an evaluation encoder error amount with respect to a master advance amount when the mechanical angle estimation value θ is corrected using both the first angle error and the second angle error.

FIG. 14 is a diagram illustrating a result of actual machine verification on the evaluation encoder error amount with respect to the master advance amount when the mechanical angle estimation value θ is corrected using only the first angle error. In other words, FIG. 14 is a diagram illustrating a result of actual machine verification on the angle error between the mechanical angle estimation value θ calculated by the following Expression (20) and the mechanical angle true value θe. FIG. 15 is a diagram illustrating a result of actual machine verification on an evaluation encoder error amount with respect to a master advance amount when the mechanical angle estimation value θ is corrected using both the first angle error and the second angle error. In other words, FIG. 15 is a diagram illustrating a result of actual machine verification on the angle error between the mechanical angle estimation value θ calculated by the above Expression (19) and the mechanical angle true value θe.

$$\theta(\Delta x)=k[i]\times\Delta x+\theta res[i]-\theta er1 \quad (20)$$

As illustrated in FIG. 14, as a result of the inventor of the present application performing the actual machine verification on the evaluation encoder error amount with respect to the master advance amount using the angle estimation method of the present invention, the angle error between the mechanical angle estimation value θ and the mechanical angle true value θe has been within about ±0.03 [deg] even when the mechanical angle estimation value θ has been corrected using only the first angle error. As illustrated in FIG. 15, as a result of the inventor of the present application performing the actual machine verification on the evaluation encoder error amount with respect to the master advance amount using the angle estimation method of the present invention, the angle error between the mechanical angle estimation value θ and the mechanical angle true value θe has been within about ±0.02 [deg] when the mechanical angle estimation value θ has been corrected using both the first angle error and the second angle error.

From these results, according to the present invention, it is possible to reduce the angle error as compared with the basic patent method.

As described above, the angle detection device 1 according to the present embodiment includes the three magnetic sensors 11, 12, and 13 that detect magnetic flux changes due to the rotation of the rotor shaft 110, and the signal processing unit 20 that processes signals output from the three magnetic sensors. The processing unit 21 of the signal processing unit 20 executes a process of acquiring signals output from three magnetic sensors as the sensor signals Hu, Hv, and Hw, where the three sensor signals Hu, Hv, and Hw have a phase difference of 120° in electrical angle from each other (step S1), a process of extracting an intersection point at which two sensor signals among the three sensor signals Hu, Hv, and Hw intersect each other and a zero-cross point at which each of the three sensor signals Hu, Hv, and Hw intersects a reference signal level over one mechanical angle cycle (step S2), and a process of generating a linear function θ(Δx) representing a straight line (segment) connecting the intersection points adjacent to each other and the zero-cross point, where Δx is a length from a start point of the segment to an arbitrary point on the segment, and θ is a mechanical angle corresponding to an arbitrary point on the segment (step S3), a process of calculating a deviation between the mechanical angle θ calculated based on the linear function θ(Δx) and the mechanical angle θe acquired from the encoder 200 installed in the rotor shaft 110 for a plurality of points on the segment as a first angle error (step S4), a process of storing the first angle error calculated for the plurality of points on the segment as a learned value (step S5), and a process of generating a first angle error function for calculating a first angle error corresponding to an arbitrary point on the segment based on the first angle error calculated for the plurality of points on the segment (step S6).

According to the present embodiment as described above, as compared with the basic patent method disclosed in JP 6233532 B2, the angle error between the mechanical angle estimation value θ and the mechanical angle true value de can be further reduced, and accordingly, the detection accuracy of the mechanical angle of the rotation shaft can be improved.

In the present embodiment, the processing unit 21 further has: a process of calculating, as a second angle error, a deviation between a value obtained by subtracting the first angle error calculated based on the first angle error function from the mechanical angle θ calculated based on the linear function θ(Δx) for a plurality of points on the segment and the mechanical angle θe acquired from the encoder 200 (step S7); a process of storing, as a learned value, the second angle error calculated for the plurality of points on the segment (step S8); and a process of generating a second angle error function for calculating a second angle error corresponding to an arbitrary point on the segment based on the second angle error calculated for the plurality of points on the segment (step S9).

According to this, since the mechanical angle estimation value θ is corrected using both the first angle error and the second angle error, the angle error between the mechanical angle estimation value θ and the mechanical angle true value θe can be further reduced as compared with the case where the mechanical angle estimation value θ is corrected using only the first angle error.

In the present embodiment, the intervals between the plurality of points on the segment are equal intervals.

According to this, for example, the first angle error and the second angle error at an arbitrary point on the segment can be accurately calculated by the linear interpolation expression as expressed by Expression (18), and the accuracy of the mechanical angle estimation value θ can be improved by correcting the mechanical angle estimation value θ using at least one of the first angle error and the second angle error.

The present invention is not limited to the above embodiments, and the configurations described in the present description can be appropriately combined within a range not conflicting with one another.

For example, in the embodiment described above, the case where the mechanical angle estimation value θ is corrected by Expression (19) using both the first angle error and the second angle error has been exemplified. However, even when the mechanical angle estimation value θ is corrected using only the first angle error (when Expression (20) is used), there is no large difference in the angle error between the mechanical angle estimation value θ and the mechanical angle true value θe. Therefore, the mechanical angle estimation value θ may be corrected by Expression (20) using only the first angle error. In this case, among the learning processing illustrated in FIG. 11, the processing from step S7 to step S9 may be deleted.

In the above embodiment, the case has been exemplified where the processing unit 21 calculates the deviation between the mechanical angle estimation value θ and the mechanical angle true value θe as the first angle error θerr for the nine attention points on the segment. However, the number of attention points arranged on the segment is not limited to nine. In the above embodiment, the segment is equally divided into eight by the nine attention points disposed at equal intervals. However, the intervals between the plurality of attention points disposed on the segment may not be equal intervals. The number of divisions of the segment is not limited to eight.

In the above embodiment, the case where the sensor magnet 120 is used as a magnet for position detection, that is, a magnet that rotates in synchronization with the rotor shaft 110 of the motor 100 has been exemplified. However, the rotor magnet attached to the rotor of the motor 100 may be used as a magnet for position detection. The rotor magnet is also a magnet that rotates in synchronization with the rotor shaft 110, and has a plurality of magnetic pole pairs.

In the above embodiment, the case where the sensor group 10 includes the three magnetic sensors 11, 12, and 13 has been exemplified, but the number of magnetic sensors is not limited to three and may be N (N is a multiple of 3). Further, in the above embodiment, the case where the sensor magnet 120 has four magnetic pole pairs has been exemplified, but the number of pole pairs of the sensor magnet 120 is not limited to four. Similarly, when the rotor magnet is used as a magnet for position detection, the number of pole pairs of the rotor magnet is not limited to four. Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An angle detection method for detecting a mechanical angle of a rotation shaft, the angle detection method comprising:
    acquiring signals output from three magnetic sensors that detect a change in magnetic flux due to rotation of the rotating shaft as sensor signals, the three sensor signals having a phase difference of 120° in an electrical angle;
    extracting an intersection point at which two sensor signals among the three sensor signals intersect with each other and a zero-cross point at which each of the three sensor signals intersect with a reference signal level over one mechanical angle cycle;
    generating a linear function θ(Δx) representing a straight line connecting the intersection point and the zero-cross point adjacent to each other, wherein Δx is a length from a start point of the straight line to an arbitrary point on the straight line, and θ is a mechanical angle corresponding to an arbitrary point on the straight line;
    calculating, as a first angle error, a deviation between a mechanical angle θ calculated based on the linear function θ(Δx) and a mechanical angle Ve acquired from an encoder installed on the rotation shaft for a plurality of points on the straight line;
    storing the first angle error calculated for a plurality of points on the straight line as a learned value; and
    generating a first angle error function for calculating the first angle error corresponding to an arbitrary point on the straight line based on the first angle error calculated for a plurality of points on the straight line,
    wherein the first angle error function is expressed by the following expression, $$\theta_{err} = \frac{\theta_{err(k+1)} - \theta_{errk}}{\frac{x_{norm}}{8}} \times \left(x - k\frac{x_{norm}}{8}\right) + \theta_{errk}$$

wherein,
k is numbers from 0 to 8 assigned to nine attention points among the plurality of points on the straight line,
Xnorm is a length from the 0th attention point to the 8th attention points, x has the same meaning as Δx, and is the length from the start point of the straight line to the arbitrary point on the straight line, θerr is the first angle error, θerr (k+1) is the first angle error at (k+1)th attention point, θerr k is the first angle error at kth attention point.

2. The angle detection method according to claim 1, further comprising:

calculating, as a second angle error, a deviation between a value obtained by subtracting the first angle error calculated based on the first angle error function from the mechanical angle θ calculated based on the linear function θ(Δx) and the mechanical angle θe acquired from the encoder for a plurality of points on the straight line;

storing the second angle error calculated for a plurality of points on the straight line as a learned value; and generating a second angle error function for calculating a second angle error corresponding to an arbitrary point on the straight line based on the second angle error calculated for a plurality of points on the straight line.

3. The angle detection method according to claim 1, wherein intervals between a plurality of points on the straight line are equal intervals.

4. An angle detection device that detects a mechanical angle of a rotation shaft, the angle detection device comprising:

three magnetic sensors configured to detect a change in magnetic flux due to rotation of the rotation shaft; and a signal processing unit configured to process signals output from the three magnetic sensors, wherein the signal processing unit is configured to execute:

acquiring signals output from the three magnetic sensors as sensor signals, the three sensor signals having a phase difference of 120° in an electrical angle from each other;

extracting an intersection point at which two sensor signals among the three sensor signals intersect with each other and a zero-cross point at which each of the three sensor signals intersect with a reference signal level over one mechanical angle cycle;

generating a linear function θ(Δx) representing a straight line connecting the intersection point and the zero-cross point adjacent to each other, wherein Δx is a length from a start point of the straight line to an arbitrary point on the straight line, and θ is a mechanical angle corresponding to an arbitrary point on the straight line;

calculating, as a first angle error, a deviation between a mechanical angle θ calculated based on the linear function θ(Δx) and a mechanical angle Ve acquired from an encoder installed on the rotation shaft for a plurality of points on the straight line;

storing the first angle error calculated for a plurality of points on the straight line as a learned value; and generating a first angle error function for calculating the first angle error corresponding to an arbitrary point on the straight line based on the first angle error calculated for a plurality of points on the straight line, wherein the first angle error function is expressed by the following expression, $$\theta_{err} = \frac{\theta_{err(k+1)} - \theta_{errk}}{\frac{X_{norm}}{8}} \times \left(x - k\frac{X_{norm}}{8}\right) + \theta_{errk}$$

wherein, k is numbers from 0 to 8 assigned to nine attention points among the plurality of points on the straight line, Xnorm is a length from the 0th attention point to the 8th attention points, x has the same meaning as Δx, and is the length from the start point of the straight line to the arbitrary point on the straight line, θerr is the first angle error, θerr (k+1) is the first angle error at (k+1)th attention point, θerr k is the first angle error at kth attention point.

5. The angle detection device according to claim 4, wherein the signal processing unit is configured to further execute:

calculating, as a second angle error, a deviation between a value obtained by subtracting the first angle error calculated based on the first angle error function from the mechanical angle θ calculated based on the linear function θ(Δx) and the mechanical angle θe acquired from the encoder for a plurality of points on the straight line;

storing the second angle error calculated for a plurality of points on the straight line as a learned value; and generating a second angle error function for calculating a second angle error corresponding to an arbitrary point on the straight line based on the second angle error calculated for a plurality of points on the straight line.

6. The angle detection device according to claim 4, wherein intervals between a plurality of points on the straight line are equal intervals.

* * * * *